United States Patent
Dorum et al.

(10) Patent No.: US 8,762,046 B2
(45) Date of Patent: Jun. 24, 2014

(54) CREATING GEOMETRY FOR ADVANCED DRIVER ASSISTANCE SYSTEMS

(75) Inventors: Ole Henry Dorum, Chicago, IL (US); James D. Lynch, Chicago, IL (US); Marianna Gnedin, Chicago, IL (US)

(73) Assignee: Navteq B.V., Veldhoven (NL)

( * ) Notice: Subject to any disclaimer, the term of this patent is extended or adjusted under 35 U.S.C. 154(b) by 758 days.

(21) Appl. No.: 12/540,704

(22) Filed: Aug. 13, 2009

(65) Prior Publication Data

US 2010/0082248 A1   Apr. 1, 2010

Related U.S. Application Data

(60) Provisional application No. 61/101,752, filed on Oct. 1, 2008.

(51) Int. Cl.
G06F 17/00 (2006.01)
G06F 19/00 (2011.01)
G01C 21/32 (2006.01)
G01C 21/26 (2006.01)

(52) U.S. Cl.
USPC ........... 701/409; 701/430; 701/436; 701/468; 340/995.14; 340/995.19

(58) Field of Classification Search
USPC ......... 701/200, 201, 208, 209, 211, 213, 400, 701/409, 410, 418, 425, 430, 431, 436, 437, 701/438, 439, 445, 446, 447, 450, 451, 454, 701/455, 457, 461, 466, 467, 468, 487, 701/489; 707/696, 741, 801; 340/988, 340/995.1, 995.14, 995.15, 995.18, 995.19, 340/995.2
See application file for complete search history.

(56) References Cited

U.S. PATENT DOCUMENTS

| | | |
|---|---|---|
| 5,471,573 A | 11/1995 | Kaasila |
| 6,029,173 A | 2/2000 | Meek et al. .................... 707/102 |
| 6,047,280 A | 4/2000 | Ashby et al. ....................... 707/2 |
| 6,161,071 A | 12/2000 | Shuman et al. ................. 701/48 |
| 6,405,128 B1 | 6/2002 | Bechtolsheim et al. ...... 701/208 |
| 7,002,578 B1 | 2/2006 | Ritter |
| 7,084,882 B1 | 8/2006 | Dorum et al. |
| 7,477,988 B2 | 1/2009 | Dorum .......................... 701/208 |
| 7,509,214 B2 | 3/2009 | Nagel ........................... 701/209 |

(Continued)

FOREIGN PATENT DOCUMENTS

| | | |
|---|---|---|
| DE | 10 2007 044 761 | 5/2008 |
| EP | 0 919 788 | 6/1999 |

(Continued)

OTHER PUBLICATIONS

Extended European Search Report from EP Application No. 09252190.5 dated Feb. 13, 2013.

(Continued)

Primary Examiner — Thomas Tarcza
Assistant Examiner — Edward Pipala
(74) Attorney, Agent, or Firm — Lempia Summerfield Katz LLC

(57) ABSTRACT

A method and system for creating geometry for ADAS are described. Link chains, which are a sequence of segments, are created. The link chains are used to create 2D splines. The link chains, the 2D splines, and height data are used to create 3D splines. The 3D splines and possibly the 2D splines are converted to Bezier curves, which can be used to create a 2D polyline. ADAS applications can use the Bezier curves and the 2D polylines to provide ADAS functions.

22 Claims, 14 Drawing Sheets

(56) References Cited

U.S. PATENT DOCUMENTS

| | | |
|---|---|---|
| 7,734,410 B2 | 6/2010 | Tooyama et al. |
| 2001/0027375 A1 | 10/2001 | Machida et al. ............... 701/209 |
| 2006/0100780 A1 | 5/2006 | Aleksic et al. ................ 701/213 |
| 2006/0155464 A1 | 7/2006 | Smartt |
| 2007/0158125 A1 | 7/2007 | Braeuchle et al. ............ 180/167 |
| 2007/0219709 A1 | 9/2007 | Ikeda ............................ 701/207 |

FOREIGN PATENT DOCUMENTS

| | | |
|---|---|---|
| EP | 1 098 168 | 5/2001 |
| EP | 1615141 | 1/2006 |
| EP | 1 857 780 | 11/2007 |
| EP | 1 962 059 | 8/2008 |
| EP | 1912176 | 1/2009 |

OTHER PUBLICATIONS

Extended European Search Report from EP Application No. 09252209.3 dated Feb. 13, 2013.

Wang et al., "Lane Detection Using B-Snake," Information Intelligence and Systems 1999 Proceedings (1999), Oct. 31-Nov. 3, 1999.

Schroedl et al., "Mining GPS Traces for Map Refinement," Data Mining and Knowledge Discovery, vol. 9, pp. 59-87 (2004), Jul. 2004.

CREATING GEOMETRY FOR ADVANCED DRIVER ASSISTANCE SYSTEMS

REFERENCE TO RELATED APPLICATIONS

This application claims the benefit of U.S. Provisional Patent Application No. 61/101,752 filed Oct. 1, 2008 and entitled "CREATING GEOMETRY FOR ADVANCED DRIVER ASSISTANCE SYSTEMS." The full disclosure of U.S. Provisional Patent Application Ser. No. 61/101,752 is incorporated herein by reference.

The present patent application is related to the copending patent application filed on the same date, Ser. No. 12/540,665, entitled "BEZIER CURVES FOR ADVANCED DRIVER ASSISTANCE SYSTEM APPLICATIONS," which is incorporated herein by reference.

FIELD

The present invention relates generally to advanced driver assistance systems (ADAS), and more particularly, relates to creating geometry for use in ADAS.

BACKGROUND

ADAS was developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic, and vision-oriented sensors, such as digital video cameras and LIDAR.

Some advanced driver assistance systems also use digital map data. These systems are sometimes referred to as map-enhanced ADAS. The digital map data can be used in advanced driver assistance systems to provide information about the road network, road geometry, road conditions, and other items associated with the road and terrain around the vehicle. Unlike some sensors, the digital map data is not affected by environmental conditions, such as fog, rain, or snow. In addition, the digital map data can provide useful information that cannot reliably be provided by sensors, such as curvature, grade, bank, speed limits that are not indicated by signage, lane restrictions, and so on. Further, digital map data can provide a predictive capability well beyond the range of sensors or even beyond the driver's vision to determine the road ahead of the vehicle, around corners, over hills, or beyond obstructions. Accordingly, the digital map data can be a useful addition for some advanced driver assistance systems.

The map-enhanced advanced driver assistance systems commonly use data from a geographic database associated with a navigation system in a vehicle. The navigation system database contains data that represents the road network in the region, such as the locations (geographic coordinates, including altitude) of roads and intersections, road names, speed limits along roads, turn restrictions at intersections, addresses or address ranges along roads, the number of lanes for each road, lane width, lane markings, functional classes of roads, the locations of medians, and so on. The navigation system database may also contain information about other geographic features, such as bodies of water, parks, administrative areas (including municipal, state, and country boundaries), and locations of points of interest, such as businesses, hospitals, police stations, and so on.

The navigation system database has much more data than an advanced driver assistance system needs. Additionally, a geographic database designed for navigation may not have all the data and/or may not have data with the accuracy levels needed by the advanced driver assistance system. As a result, there has been some effort in designing a geographic database specifically for advanced driver assistance systems. For example, U.S. Patent Publication No. 2006/0100780 describes a geographic database having a data storage format designed for a sensor device in a motor vehicle system. However, there is room for improvement in a geographic database designed specifically for advanced driver assistance systems.

SUMMARY

A method and system for creating geometry for ADAS are described. Link chains, which are a sequence of road segments, are created using a software routine. The software routine selects a first road segment having an associated functional class. At each node, the software routine selects the next road segment to add to the link chain. The link chain continues to grow until finding a terminal node.

The link chains are fitted to create 2D B-splines. The 2D B-splines are manipulated to correct irregularities and alignment problems. Knots not needed to preserve the position, curvature, slope, and/or heading are removed to minimize storage requirements.

The link chains, optimized 2D B-splines, and height data are used to create 3D splines. The height data is preferably obtained from GPS/IMU traces collected as vehicles travel on roads represented by the road segments. The height data is corrected at crossing nodes to account for GPS height inaccuracies. The link chains are fitted to create an altitude B-spline using the corrected height data. The 2D B-spline and the altitude B-spline are merged to obtain a 3D B-spline. Like the 2D B-spline, knots not needed to preserve the position, curvature, slope and/or heading are removed from the 3D B-spline to minimize storage requirements.

The 3D B-splines and possibly the 2D B-spines are converted to Bezier curves. The Bezier curves can be used to efficiently create 2D polylines and compute curvature, slope, and heading. ADAS applications can use the Bezier curves to provide ADAS functions and polylines for map matching.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

ADAS Architecture

Figure 1:
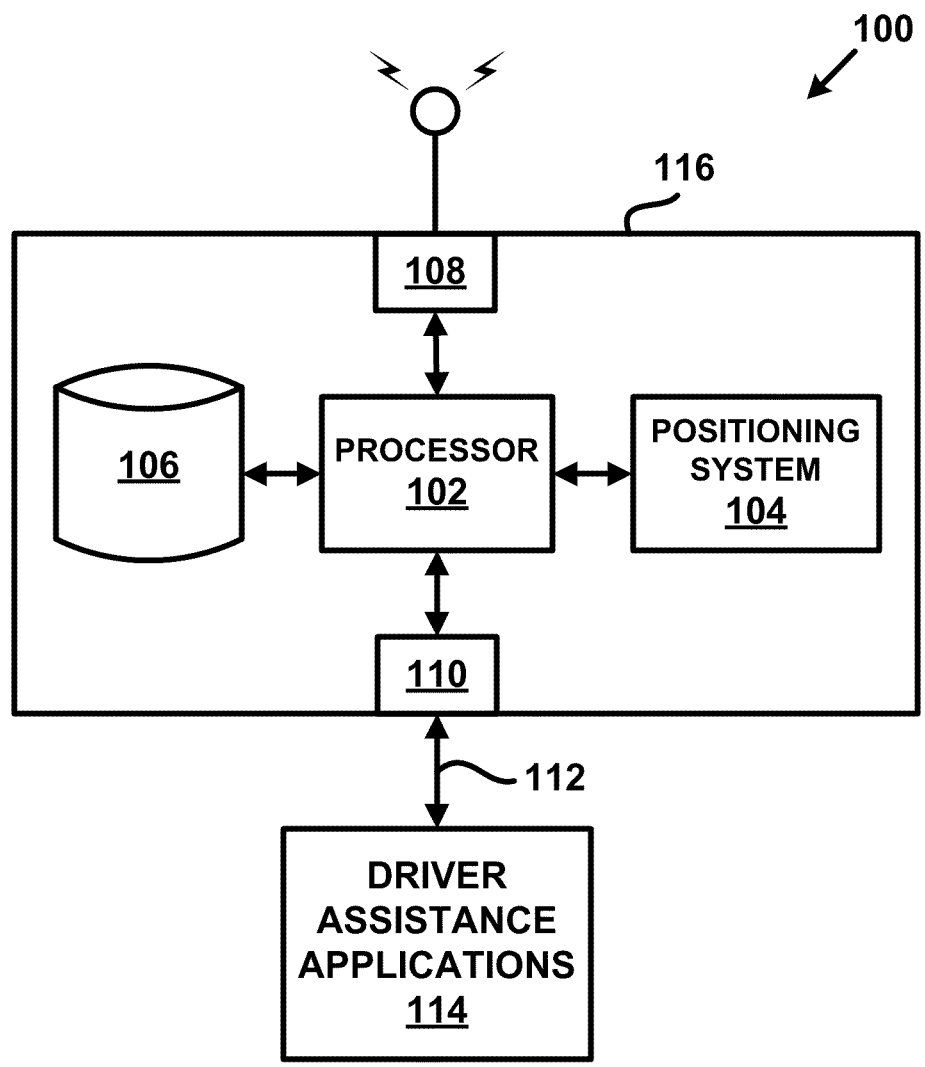
FIG. 1 is a block diagram of map-enhanced ADAS architecture, according to an example.

FIG. 1 is a block diagram of map-enhanced ADAS architecture 100. In this example, the map-enhanced ADAS architecture 100 includes driver assistance applications 114 and a map and positioning engine (MPE) 116. The MPE 116 is shown in FIG. 1 as a standalone module; however, it is understood that the MPE 116 may be distributed into multiple packages and/or integrated into other device packages, such as a sensor package. The MPE 116 includes a processor 102, a positioning system 104, a geographic database 106, a communications system 108, and an in-vehicle data bus interface 110. The MPE 116 may also include other hardware, software, and/or firmware, such as memory and a power source.

The processor 102 may be any type of processor, controller, or other computing device. For example, the processor 102 may be a digital signal processor. The processor 102 receives inputs from the positioning system 104, the geographic database 106, the communication system 108, the in-vehicle data bus interface 110, and other sources. The processor 102 then processes the inputs using application software programs 200, some of which are described with reference to FIG. 2.

The processor 102 then provides outputs to the driver assistance applications 114 via the in-vehicle data bus interface 110 and a data bus 112. Preferably, the in-vehicle data bus interface 110 and the data bus 112 are a Controller-Area Network (CAN) interface and a CAN bus, which are designed for automotive applications. The driver assistance applications 114 may include adaptive headlight aiming, adaptive cruise control, obstruction detection, obstruction avoidance, collision avoidance, adaptive shift control, and others.

The positioning system 104 may utilize GPS-type technology, a dead reckoning-type system, or combinations of these or other systems, which are known in the art. The positioning system 104 may also include suitable sensing devices that measure the traveling distance speed, direction, orientation, and so on. For example, the positioning system 104 may include a GPS system and a gyroscope. The positioning system 104 provides an output signal to the processor 102. Some of the application software programs 200 that run on the processor 102 use the output signal from the positioning system 104 to determine the location, direction, orientation, etc., of the MPE 116.

The geographic database 106 is designed for ADAS applications. Like a navigation system geographic database, the geographic database 106 contains data about roads and intersections in a geographic region. For example, the geographic database 106 contains at least one database record (also referred to as "entity" or "entry") for each road segment (also referred to as a link). When the road segment is represented as B-spline or Bezier curve(s), the road segment data record includes data providing the geographic coordinates (e.g., the latitude, longitude, and altitude) of control points. The end points (also referred to as nodes) of the road segment correspond to the first and last control points. Additionally, the road segment data record may also contain a knot vector for B-spline geometry.

When the road segment is represented as shape point geometry, the road segment data record includes data providing the geographic coordinates (e.g., the latitude, longitude, and altitude) of the end points of the represented road segment. For curved segments, the road segment data record also includes data providing the geographic coordinates (e.g., the latitude, longitude, and altitude) of the shape points used to characterize the polyline.

The road segment data record is further described with reference to FIG. 3.

The geographic database 106 may include higher quality (i.e., more accurate) data than the data typically contained in a navigation system geographic database. For example, with respect to road geometry, the data in the geographic database 106 may be more accurate with respect to longitude, latitude, and/or altitude. Also, the starting and stopping locations of tunnels may be more accurately specified in the geographic database 106. Further, the data in the geographic database 106 may be more accurate with respect to derived information, such as curvature.

The geographic database 106 may also include more kinds of data (e.g., more kinds of attributes) than the data typically contained in a navigation system geographic database. For example, the geographic database 106 may include data about road objects, such as signs and crosswalks, including their positions along a road segment, sign object type, and sign text. Some of the data attributes found in the geographic database 106 are described with reference to FIG. 4.

Figure 2:
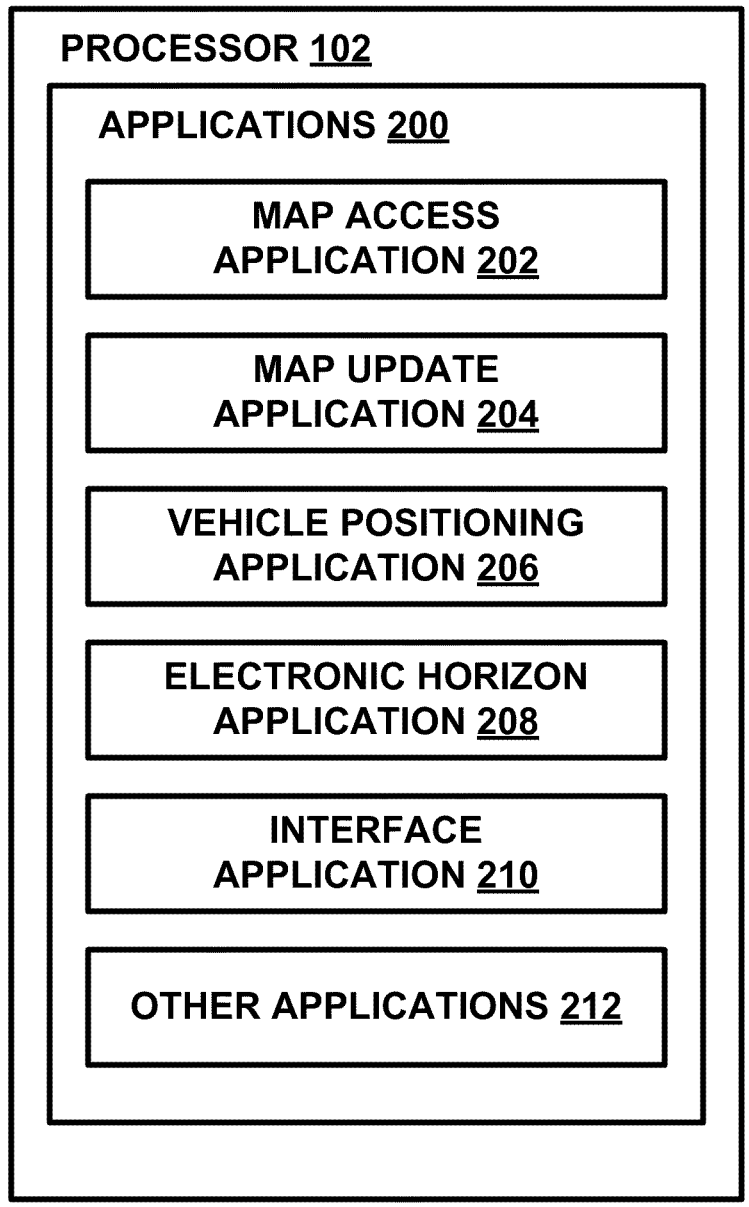
FIG. 2 is a block diagram of software applications available to a processor depicted in FIG. 1, according to an example.

FIG. 2 is a block diagram depicting some of the software applications 200 available to the processor 102. The software applications 200 depicted in FIG. 2, include a map access application 202, a map update application 204, a vehicle positioning application 206, an electronic horizon application 208, and an interface application 210. As this is not an exhaustive list of all the software applications 200 available to the processor 102, FIG. 2 also depicts other applications 212, which may include a startup routine, self-test diagnostics, and so on.

The map access application 202 provides data access to the geographic database 106 stored on physical storage media. The map access application 202 receives a request for data from the processor 102 and locates data responsive to the request on the physical storage media. The map access application 202 preferably provides an application programming interface (API) for use by the processor 102 and/or the applications 200.

The map update application 204 facilitates updates to the geographic database 106. The communications system 108 receives one or more parcels that either add additional coverage to an existing database or replace existing parcels. A parcel is a unit of storage for storing geographic data in the geographic database 106 on physical storage media. For new parcels, the map update application 204 stores the parcel on the physical storage media. For existing parcels, the map update application 204 replaces the old parcel with the new parcel on the physical storage media.

The vehicle positioning application 206 determines the vehicle's position relative to a road network that is represented by data included in the geographic database 106. The vehicle positioning application 206 uses the output from the positioning system 104 and matches the output to data in the geographic database 106 using a vehicle positioning algorithm, which is sometimes referred to as a map matching algorithm.

The electronic horizon application 208 determines an electronic horizon. An electronic horizon is a collection of roads and intersections leading out from the current vehicle position to an extent determined by the electronic horizon application 208. The collection of roads and intersections are potential paths that the vehicle may follow from the current vehicle position. The electronic horizon application 208 determines extent using one or more costing functions. The costing functions are based on the needs of the driver assistance applications 114 and may take into consideration various factors, such as vehicle speed, travel time, and driving distance. An example electronic horizon application is described in U.S. Pat. No. 6,405,128, which is assigned to the same assignee as the current application and is hereby incorporated by reference in its entirety.

The interface application 210 controls communications between the MPE 116 and the driver assistance applications 114 via the interface 110 and the bus 112. Preferably, the interface application 210 is based on the CAN protocol, which is a serial communication protocol for communicating between various electronic devices in the vehicle. In accordance with the CAN protocol, the various electronic devices in the vehicle can be coupled to a single serial bus (e.g., the bus 112) such that messages and data can be sent from one electronic device in the vehicle to another. The CAN protocol is a message based protocol in which CAN frames are placed on a common CAN bus. The CAN bus may be a single wire or a differentially driven pair of wires.

Figure 3:
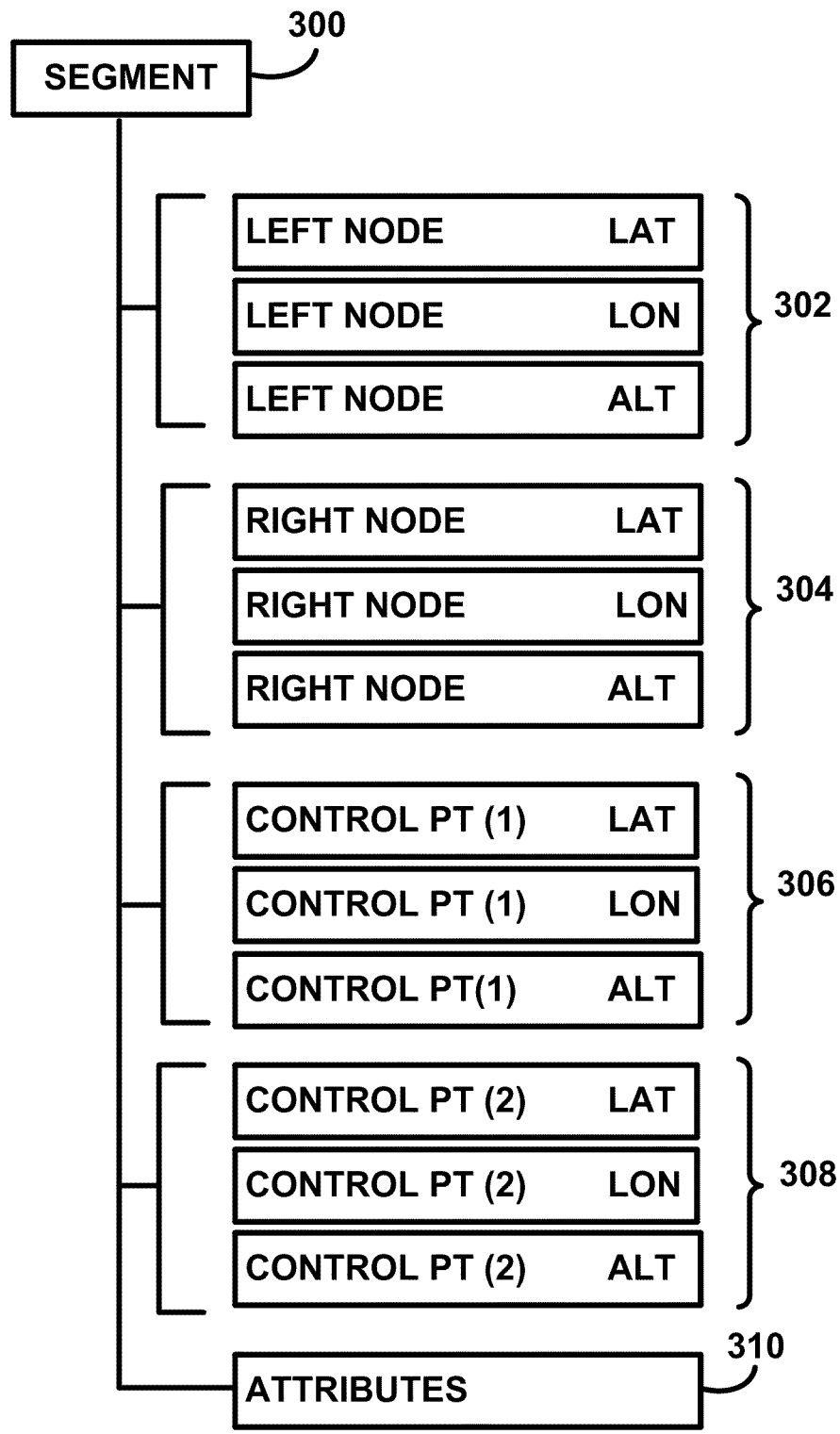
FIG. 3 is a block diagram of a road segment data record from the geographic database depicted in FIG. 1, according to an example.

FIG. 3 is a block diagram of a road segment data record 300 from the geographic database 106. The road segment data record 300 includes data used to represent a portion of the road. The data include node data 302, 304, which identify the latitude, longitude, and altitude coordinate positions of the end points of the segment.

The data also include control point data 306, 308, which identify the latitude, longitude, and altitude coordinate positions of control points that can be used to represent the shape of a straight or curved segment. While the data for two control points are shown in FIG. 3, it is understood that a segment can contain more than one curve and the number of control points may depend on the number and shape of the curves in the segment. For example, each cubic Bezier curve is represented by four control points, but the last control point of a previous Bezier curve is the same as the first control point of the next Bezier curve. The road segment data record 300 stores data for the number of control points equal to the number of Bezier curves multiplied by three, plus one.

Figure 4:
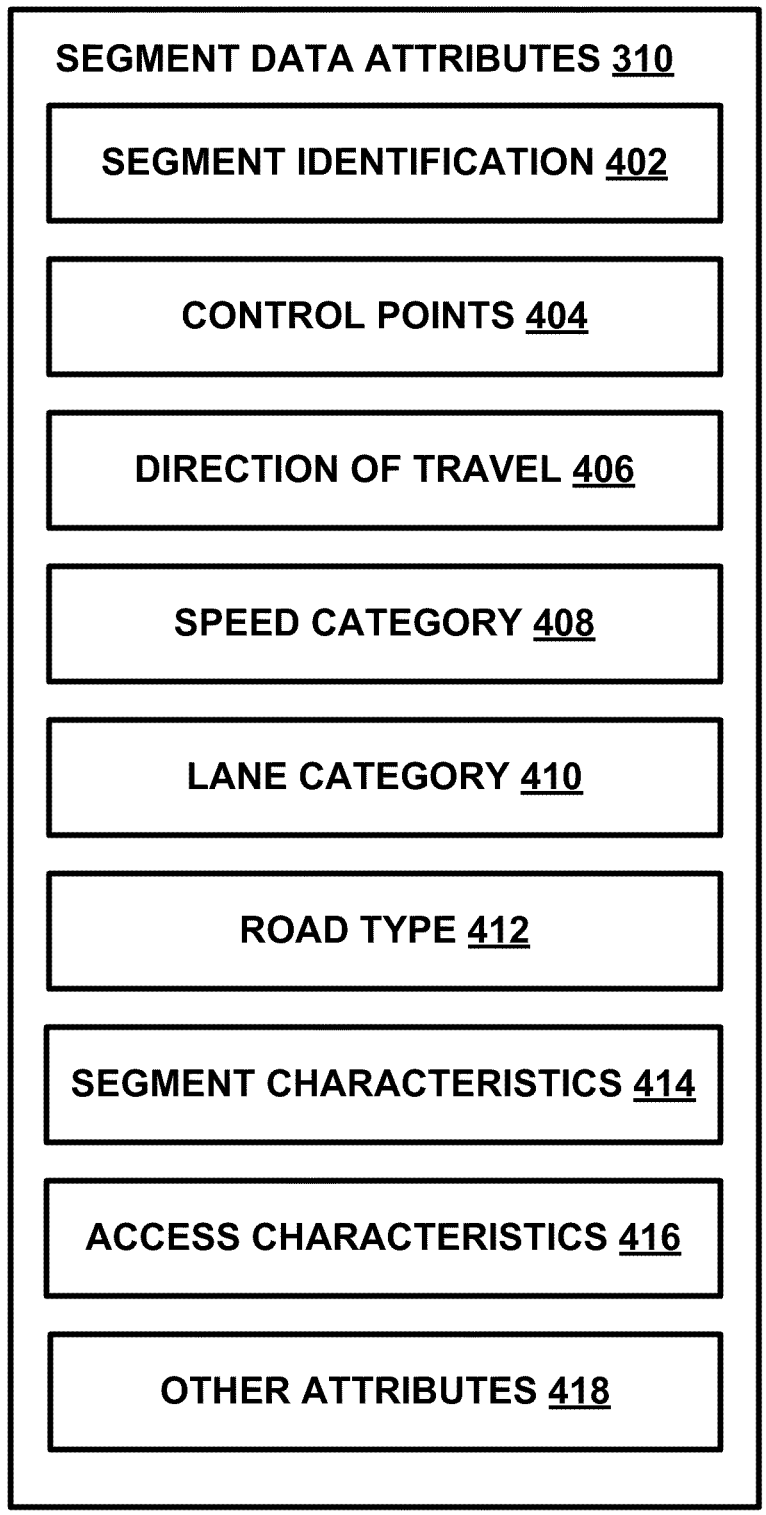
FIG. 4 is a block diagram of data attributes for the road segment data record depicted in FIG. 3, according to an example.

The data further include attributes 310 for the segment. Some of the attributes 310 of the segment are depicted in FIG. 4. The road segment data record 300 may include additional data, such as shape point data, as well.

FIG. 4 is a block diagram of some of the data attributes 310 for a road segment data record 300. The data attributes 310 depicted in FIG. 4 include segment identification (ID) 402, control points 404, direction of travel 406, speed category 408, lane category 410, road type 412, segment characteristics 414, and access characteristics 416. As this is not an exhaustive list of all the data attributes for the road segment data records, FIG. 4 also depicts other attributes 418. For example, the segment data attributes 400 may also include references to node data records in the form of a node ID corresponding to end points 302, 304 of the segment.

The segment ID 402 identifies a data record in the geographic database 106.

The control point attributes 404 contain bit flags that provide additional information regarding control points to aid in the creation of curvature and slope profiles. For example, the control point attributes 404 may include a byte-size flag per control point. One of the bits in the flag is assigned to curvature, while another of the bits is assigned to slope. If the curvature bit flag is set to one, then the control point is marked as part of the curvature profile. Similarly, if the slope bit flag is set to one, then the control point is marked as part of the slope profile.

The direction of travel attribute 406 represents the allowed direction of traffic flow on a segment. For example, the segment may represent a portion of a road network in which travel is permitted in both directions. Alternatively, the segment may represent a portion of a road network allowing only one-way travel. The direction of travel attribute 406 identifies whether the segment allows bi-directional travel or unidirectional travel, and if unidirectional, the direction of travel attribute 406 also identifies the allowed direction of travel.

The speed category attribute 408 represents the general speed trend of a road based on posted or implied speed limit. The speed category attribute 408 contains data associated with a speed range. For example, the speed category attribute 408 may include a data representation of the integer 1 for speeds exceeding 80 mph, the integer 2 for speeds in the range of 65-80 mph, the integer 3 for speeds in the range of 55-64 mph, and so on until the speed range includes 0 mph.

The lane category attribute 410 represents the predominant number of lanes on a segment in one direction of travel. Preferably, the lane category attribute 410 does not include turn lanes. If the number of lanes is different for each direction, the lane category attribute 410 may represent the higher number.

The road type attribute 412 represents the type of road and/or functional class that the segment represents. For example, the road type attribute 412 may contain data associated with an interstate highway, a controlled access highway, a pedestrian walkway, and so on.

The segment characteristic attribute 414 contains bit flags that describe various characteristics of the segment. For example, the segment characteristic attribute 414 may identify whether a segment is paved, a ramp, a bridge, a tunnel, a roundabout, and so on.

The access characteristic attribute 416 contains bit flags that define the types of traffic allowed on the segment. For example, the access characteristic attribute 416 may identify whether cars, buses, trucks, taxis, emergency vehicles, pedestrians, and so on are allowed on the segment.

Creating Geometry for the MPE

Figure 5:
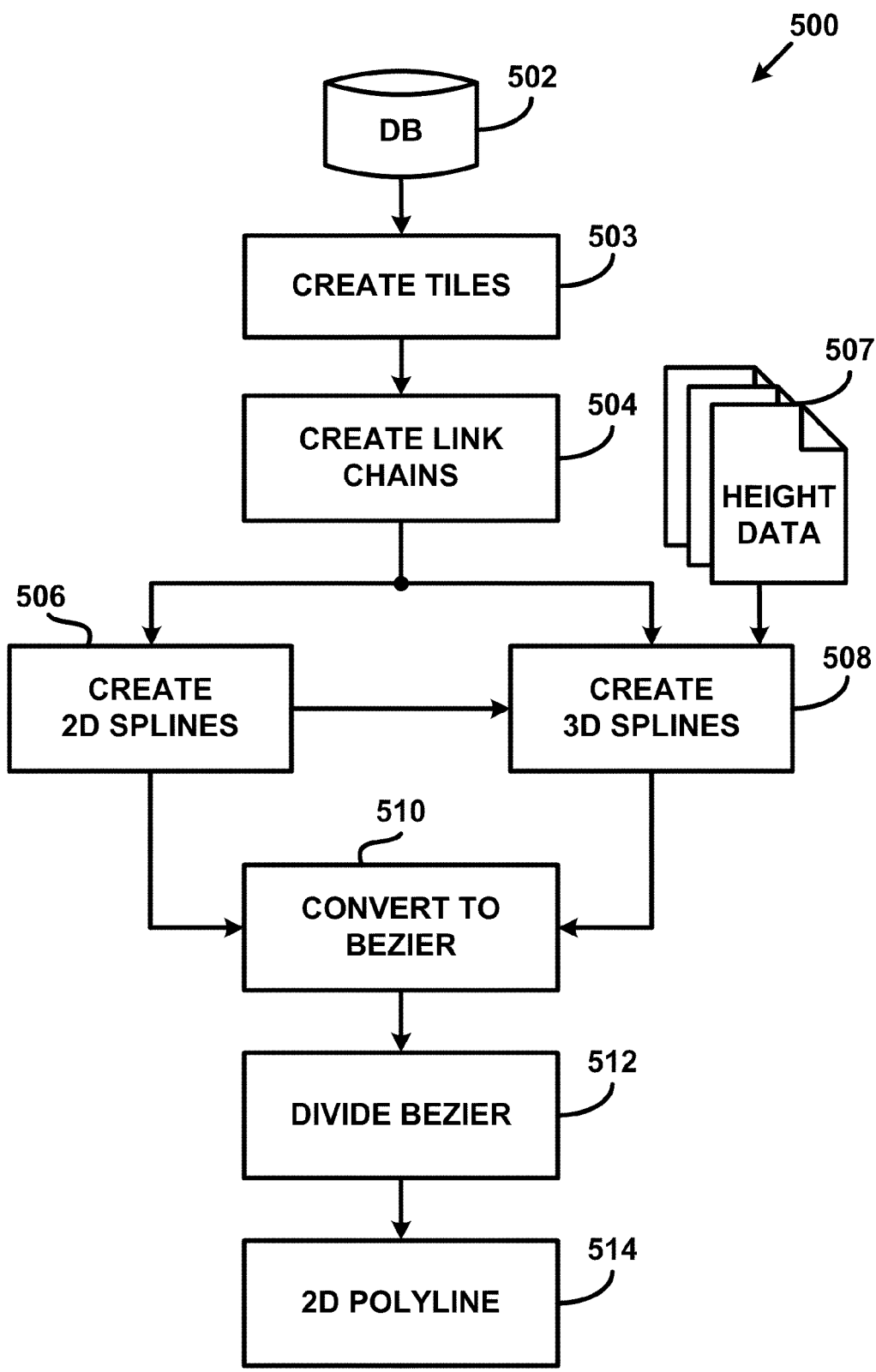
FIG. 5 is a flow chart for creating geometry for ADAS, according to an example.

FIG. 5 is a flow chart of a method 500 for creating geometry for the MPE 116. At block 503, the method 500 subdivides a geographic database 502 into tiles to enable parallel processing. The geographic database 502 may be the geographic database 106 or a different database that includes the data in the geographic database 106.

The tiles are formed in such a way that each tile contains approximately equal amount of nodes and shape points. The map surface is covered by an imaginary 2D rectangular grid with fine (approximately 2 km by 2 km) cells. Then, the density of the nodes and shape points is computed by mapping the nodes and shape points in the geographic database 502 onto the grid. The tiles are assembled from the grid cells.

In order to ensure that each tile has approximately equal number of nodes and shape points, the whole grid is recursively subdivided in half along the grid lines, both in horizontal and vertical directions, in such a way that each of the two partitions contain an equal number of geometrical points. The process continues until the tiles contain an amount of nodes and shape points that is smaller than a predefined threshold. The direction of each subdivision is selected in such a way that the aspect ratio of the tiles is minimized.

At block 504, the method 500 creates link chains within each tile using data from the geographic database 502. The link chains are a sequence of segments, with each of the segments having the same road type attribute 412. The sequence of segments is preferably made as long as possible. The link chains are used to perform a B-spline fit to ensure smoothness across segment boundaries. The process of creating link chains 504 is further described with respect to FIG. 8.

At block 506, the method 500 creates 2D B-splines using the link chains created at block 504. At block 508, the method 500 creates 3D B-splines using the link chains created at block 504, the 2D B-splines created at block 506, and height data 507. The height data 507 is preferably obtained from GPS/IMU traces collected as vehicles travel on roads represented by the road segments. However, the height data 507 may be obtained from other sources and/or sensors. The process of creating 2D B-splines 506 is described with respect to FIG. 9, while the process of creating 3D B-splines 508 is described with respect to FIGS. 15 and 16.

A spline refers to any composite curve formed with piecewise polynomial functions representing curve sections and satisfying specified conditions at boundaries of the sections. Thus, there are many types of spline curves including B-splines. A B-spline has control points and knots. Knots are the points at which individual polynomial curve segments of a polynomial spline curve join together. The segments are joined in such a way as to provide smoothness of the complete curve. A knot vector is an ordered list of non-decreasing floating point numbers that describe points along the spline curve where segments begin and end. Splines are well-known in the art.

With splines, map features, including curving road portions, are represented by polynomial equations whose coefficients have been determined so as to generate curves that match the shapes of the geographic features with the desired degree of accuracy. Thus, splines are a means of describing the shape of the underlying road geometry by specifying the coefficients of a polynomial equation. As described in U.S. Pat. No. 7,084,882, splines have been used to represent shapes of road segments in navigation system databases. U.S. Pat. No. 7,084,882 is assigned to the same assignee as the current application and is hereby incorporated by reference.

At block 510, the 2D B-splines and the 3D B-splines may be converted to Bezier curves. If a segment does not have height data, the 2D B-spline is converted to a Bezier curve. However, if the segment does have height data, the 2D B-spline may only be used to create the 3D B-spline at block 508.

Cubic Bezier curves are defined by two end points and two additional control points that are positioned along tangents to the curve at the end points. The cubic Bezier curve equation can be written in vector form as follows:

$$\vec{B}(t) = (1-t)^3 P_0 + 3t(1-t)^2 P_1 + 3t^2(1-t)P_2 + t^3 P_3$$

where $P_0$, $P_1$, $P_2$, and $P_3$ are the control points and t is the parameter. Bezier curves can be derived from B-spline curves using known methods.

While spline geometry is useful for representing road segment geometry, the use of B-splines in the MPE 116 increases the computational requirements for the vehicle positioning and the electronic horizon applications 206, 208. The analytical B-spline geometry is converted into a Bezier representation to facilitate real time derivation of a polyline representation by the vehicle positioning application 206 and an electronic horizon by the electronic horizon application 208.

Figure 6:
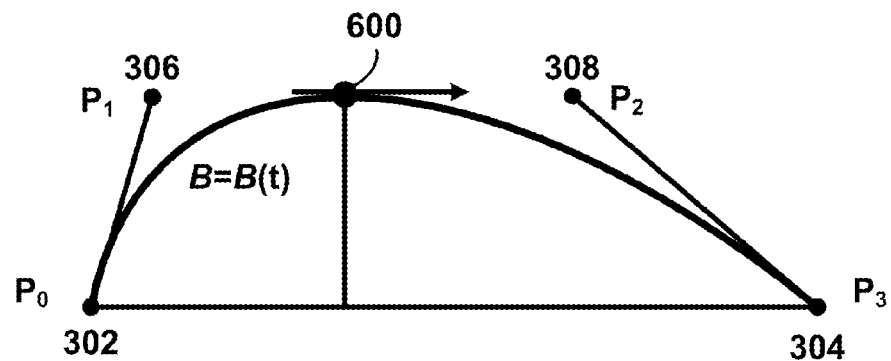
FIG. 6 is a diagram of an example Bezier curve.

At block 512, the Bezier curves are divided so that the vehicle positioning application 206 can derive a 2D polyline representation in real time. The method 500 assumes that the road geometry has Bezier curves such that when a point farthest from its chord is projected onto the chord line, the point falls inside the chord. The Bezier road geometry is divided after identifying a point 600 (or possibly more than one point) at a furthest distance (or distances) from the Bezier curve to a line connecting the end points 302, 304 of the curve (i.e., the control polygon base chord, $\overrightarrow{P_0 P_3}$) as shown in FIG. 6. Also seen in FIG. 6, the furthest distance is generally not in the center of the curve.

The optimal subdivision point 600 is the point on the Bezier curve that is the furthest from the control polygon base chord. The position of the point 600 is obtained analytically from the condition that the 2D tangent to the Bezier curve B(t) at the point 600 is parallel to the chord.

$$\frac{d\vec{B}}{dt} = \alpha \overrightarrow{P_0 P_3}.$$

The expression above is reduced to a quadratic equation for the parameter t. For a general Bezier curve, the quadratic equation may not have real roots in the interval [0-1] on which the parameter t is defined. However, for well-behaved Bezier curves, the quadratic equation will have one or two real roots in the [0-1] interval. If the quadratic equation has two real roots, two subdivision points are used to split the Bezier curve at two points. Once the point 600 is obtained, the Bezier curve is split in two using the de Casteljau subdivision algorithm. The resulting Bezier curves are stored in the geographic database 106.

Figure 7:
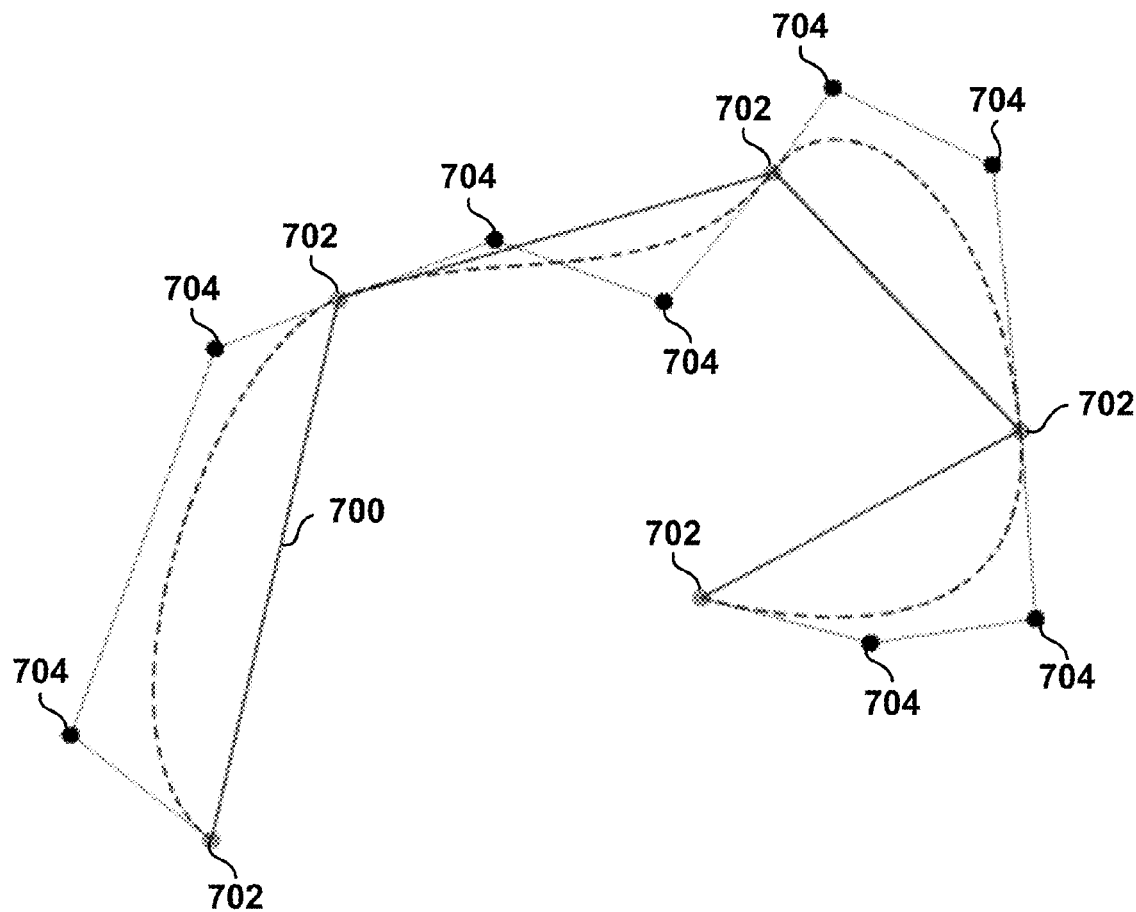
FIG. 7 is a diagram of an example polyline generated from Bezier curves.

At block 514, the vehicle positioning application 206 derives a 2D polyline representation in real time. An example polyline representation 700 is depicted in FIG. 7. The vehicle positioning application 206 derives the polyline representation 700 by connecting the end points 702 of the Bezier curves while ignoring the internal control points 704.

Creating Link Chains

Figure 8:
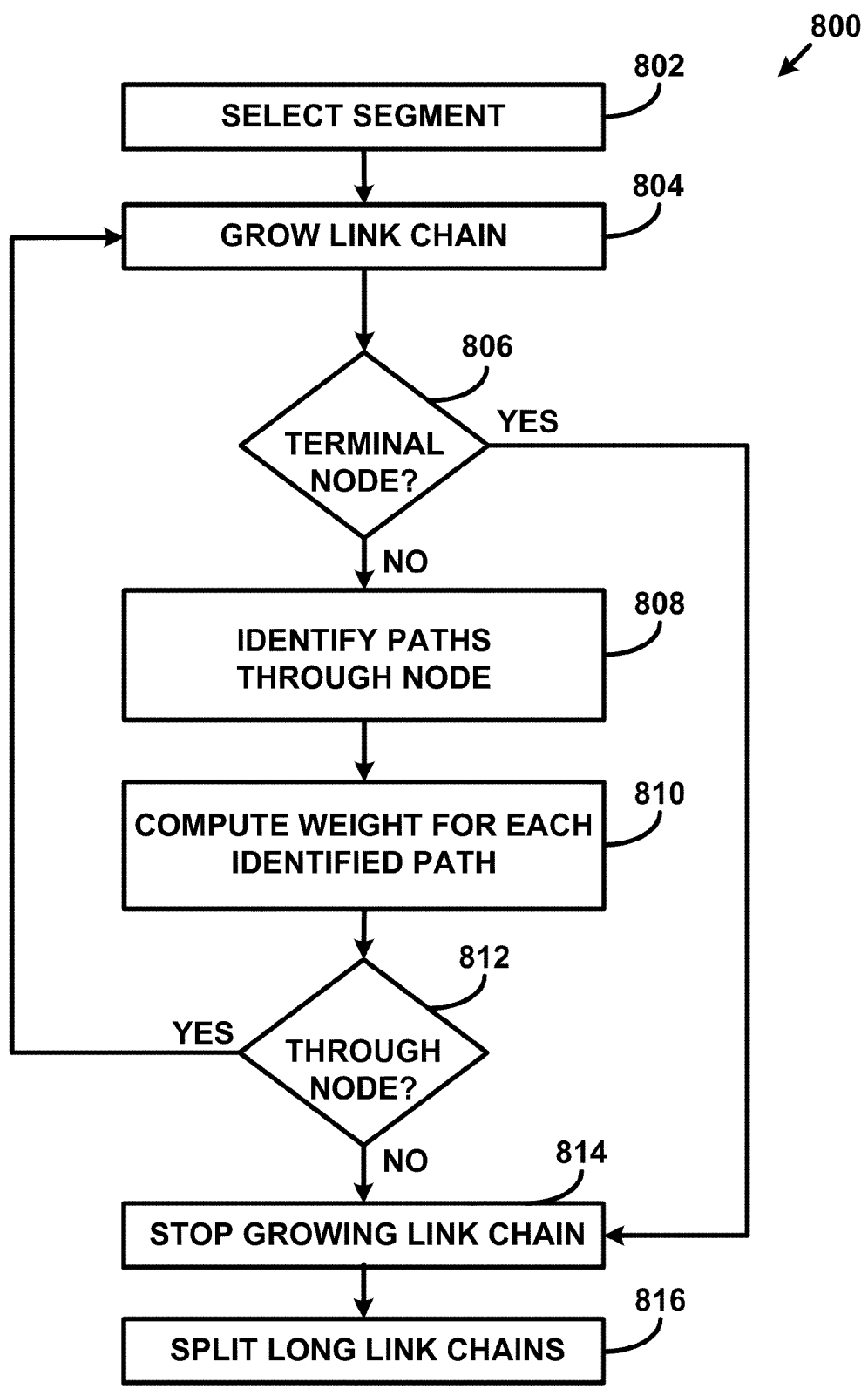
FIG. 8 is a flow chart for creating link chains, according to an example.

FIG. 8 is a flow chart of a method 800 for creating link chains. The method 800 for creating link chains is a software routine (or a plurality of software routines) that may be performed on any computer prior to storing data in the geographic database 106 for use in the MPE 116.

At block 802, the link chain routine 800 selects a segment to start the link chain. Each segment has two nodes (also called end points). Not all nodes are at intersections. For example, some nodes are used to encode changes in road attributes.

At block 804, the link chain is grown in both directions by including neighboring segments. At block 806, the link chain routine 800 determines if the node is terminal and the link chain should stop in that direction at that node. The link chain routine 800 uses rules for determining if a node is terminal or not. The rules to determine if the link chain should proceed through the node (i.e., a non-terminal node) may include:

1. Two adjacent segments in a link chain should have a common node.
2. The segments in a link chain should belong to the same functional class.
3. A segment should only be included in one link chain.
4. Each segment should be included in a link chain.
5. A link chain that contains roundabout segments (i.e., segments associated with a roundabout attribute 414) should not contain regular segments.
6. If the angle between two segments exceeds a predefined threshold, then the segments should not form a link chain. This rule is not applicable to roundabout chains.
7. Node connects to at least two links.

Other rules for identifying terminal nodes may also be used. If at block 806, the link chain routine 800 identifies a terminal node, the link chain routine 800 stops growing the link chain at block 814.

If at block 806, the link chain routine 800 does not identify a terminal node, at block 808, the link chain routine 800 determines an optimal path through a node. At each node, the link chain routine 800 identifies the possible paths through the node that could be added to the link chain.

At block 810, the link chain routine computes a path weight for each identified possible path. The path weight is determined using the lane category attribute 410, the road type attribute 412, and other attributes 418, such as the angle of the path from the node and whether a road divider is located on the road represented by the segment. Additionally, the path weight is determined in a manner to limit the amount of change in a direction through an intersection.

One way to determine which path to use for continuing the link chain is based on the combination of two factors: the angle between the links and the difference in the number of lanes between the links. The probability of a link chain continuing onto a new link may be determined according to the following formula:

$$P = 0.7 * P_{angle} + 0.3 * P_{lane\#},$$

where $$P_{angle} = \frac{180 - \text{angle}}{180} \text{ and } P_{lane\#} = \frac{10 - |\Delta lane\#|}{10}.$$

Here angle is the angle between the links in degrees and Δlane# is the difference in number of lanes between links (not to exceed 10).

At every node where more than two links intersect, the possible ways of forming a legitimate link chains are compared and ranked according to the calculated probability, and the best choice is selected. Consequently, the formation of the link chains does not depend on the order in which link chains are created.

At block 812, the link chain routine 800 determines whether to continue through the node based on the computed path weight at block 810. If the link chain routine 800 decides to go through the node, the path with the highest weight is chosen to be added to the link chain at block 804. If not, the link chain routine 800 stops growing the link chain at block 814.

At block 816, the link chain routine 800 splits link chains that are too long to be curve fitted in one operation. The determination may be made based on the length of the chain (e.g., length exceeds 25 km), the total number of nodes and shape points (e.g., excess of 5000), and/or other factors. Preferably, the link chain routine 800 splits the link chains close to the middle of the polyline length and where the link chain polyline is as straight as possible.

To achieve both objectives, the link chain routine 800 starts the search in both directions, starting from the node that is located closest to the middle of the link chain. For every node considered, the link chain routine 800 builds a window around the node to determine if the node is located within a relatively straight segment. The link chain routine 800 determines if a segment is straight by projecting the internal points on the segment formed by the two end points and verifying that the distances from points to the segment do not exceed a threshold and that the internal points project into the interior of the segment. The link chain routine 800 continues the search in both directions until finding a node meeting the objectives. If the link chain routine 800 does not find a good node for the split, the link chain routine 800 relaxes the straight segment criteria and repeats the search again.

Creating 2D B-splines

Figure 9:
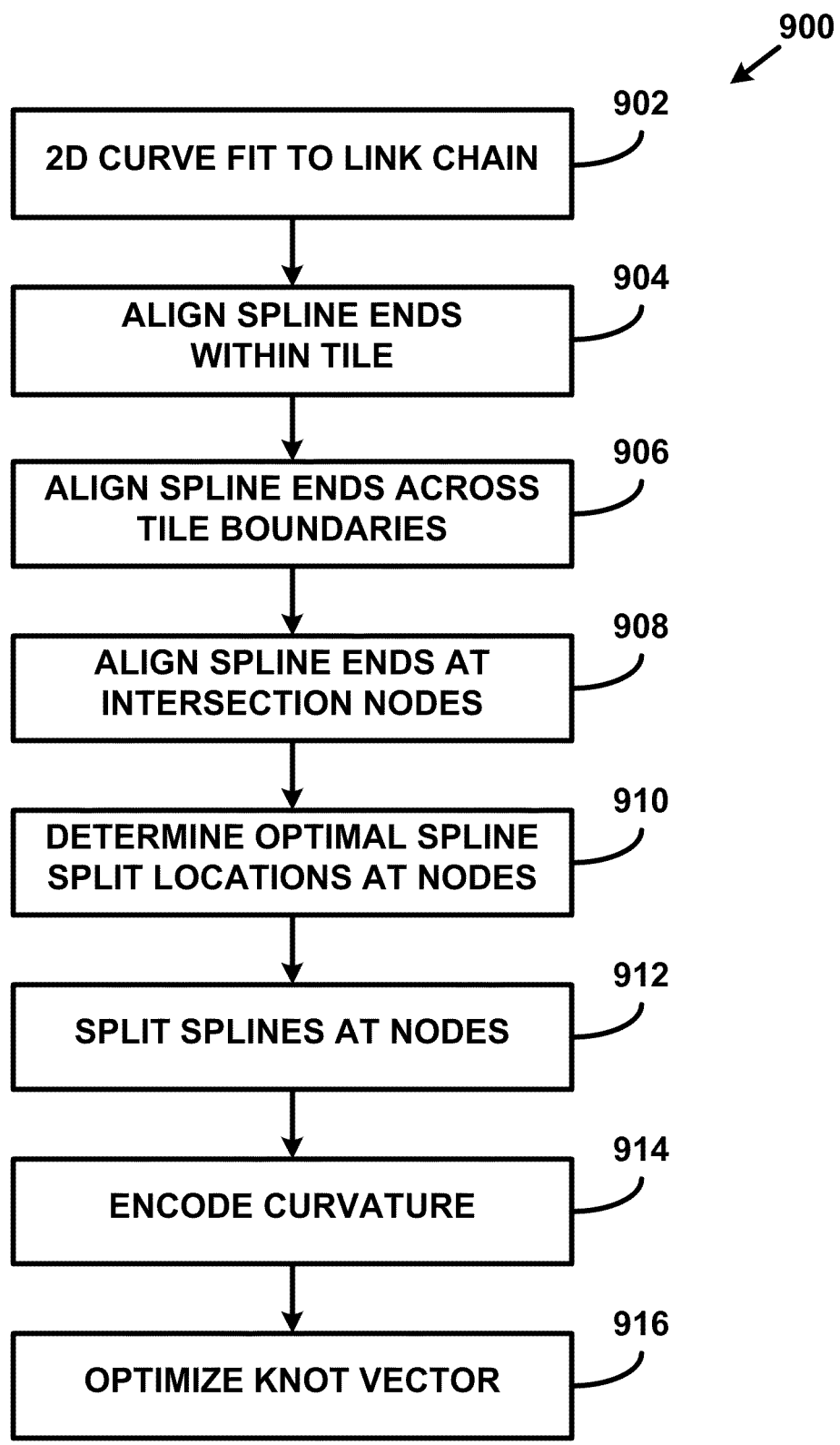
FIG. 9 is a flow chart for creating 2D B-splines, according to an example.

FIG. 9 is a flow chart of a method 900 for creating 2D B-splines from the link chains. Like the method 800, the method 900 for creating 2D B-splines is a software routine (or a plurality of software routines) that may be performed on any computer prior to storing data in the geographic database 106 for use in the MPE 116.

At block 902, the 2D B-spline routine 900 fits the link chains created by the method 800 to a 2D B-spline. The 2D B-spline routine 900 fits the 2D B-spline to a single link chain including data points from the chain's neighboring link chains at both ends when possible. By including data points from neighboring link chains, the 2D B-spline routine 900 causes successive curve fits to overlap, which may ensure shape consistency at the boundary between curve fits. The decision for when to use data points from neighboring link chains is controlled by rules. A roundabout is an example of when data points from neighboring link chains are not used. The overlap of neighboring link chains may be significant (typically several kilometers).

The 2D curve fitting technique iteratively determines the optimal local curve stiffness based on the specified curve fit tolerance. The 2D B-spline routine 900 uses calculus of variations to regularize the spline fit by minimizing the change of curvature along the spline. The curve fit is performed by minimizing the following functional:

$$\Im = \text{Min}\left\{\sum_{i=1}^{N}(p_i - f(i))^2 + v_j(s)\int_\Omega \left|\frac{\partial k}{\partial s}\right| ds\right\}$$

where $v_j(s)$ expresses varying amount of regularization along the curve for iteration number [j]. $v_j(s)$ may be a continuous function as a function of arc length along the curve or implemented discretely, such as a unique value for each curve segment of the spline.

The integral $$\int_\Omega \left|\frac{\partial k}{\partial s}\right| ds$$

expresses change of curvature along the fitted curve. The regularization function to minimize the change of curvature can alternately be expressed as $$\int_\Omega \left(\frac{\partial k}{\partial s}\right)^2 ds.$$

The Least Squares term $$\sum_{i=1}^{N}(p_i - f(i))^2$$

measures the deviation between the fitted curve and the data points. Overall, the curve fitting minimization functional minimizes the deviation from the data points while ensuring that the curvature changes as little as possible while staying consistent with the data points to capture the shape of the underlying road geometry. The 2D spline fit to link chains in block 902 is described in more detail with reference to FIG. 12.

Figure 10:
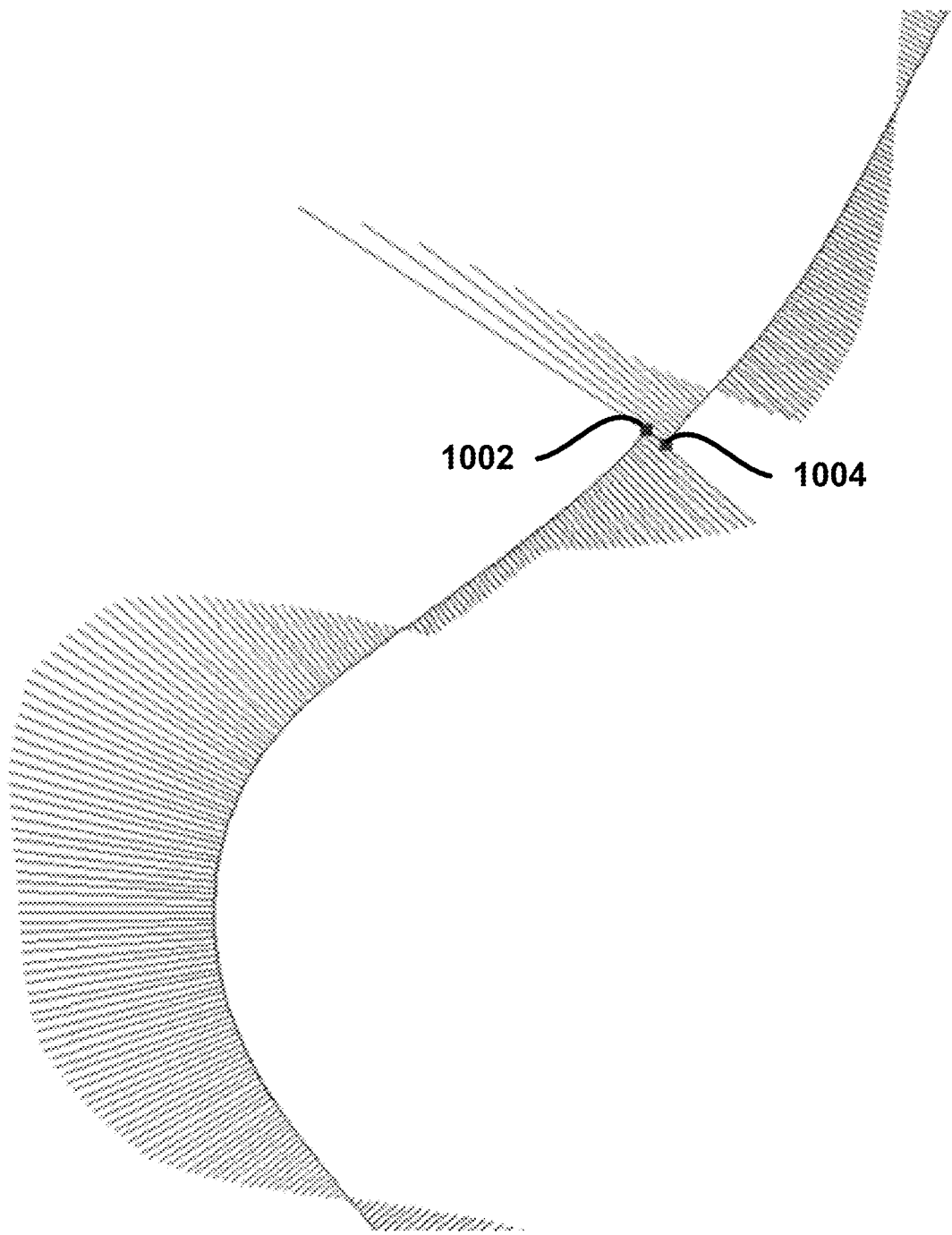
FIG. 10 depicts misaligned B-spline ends, according to an example.
Figure 11:
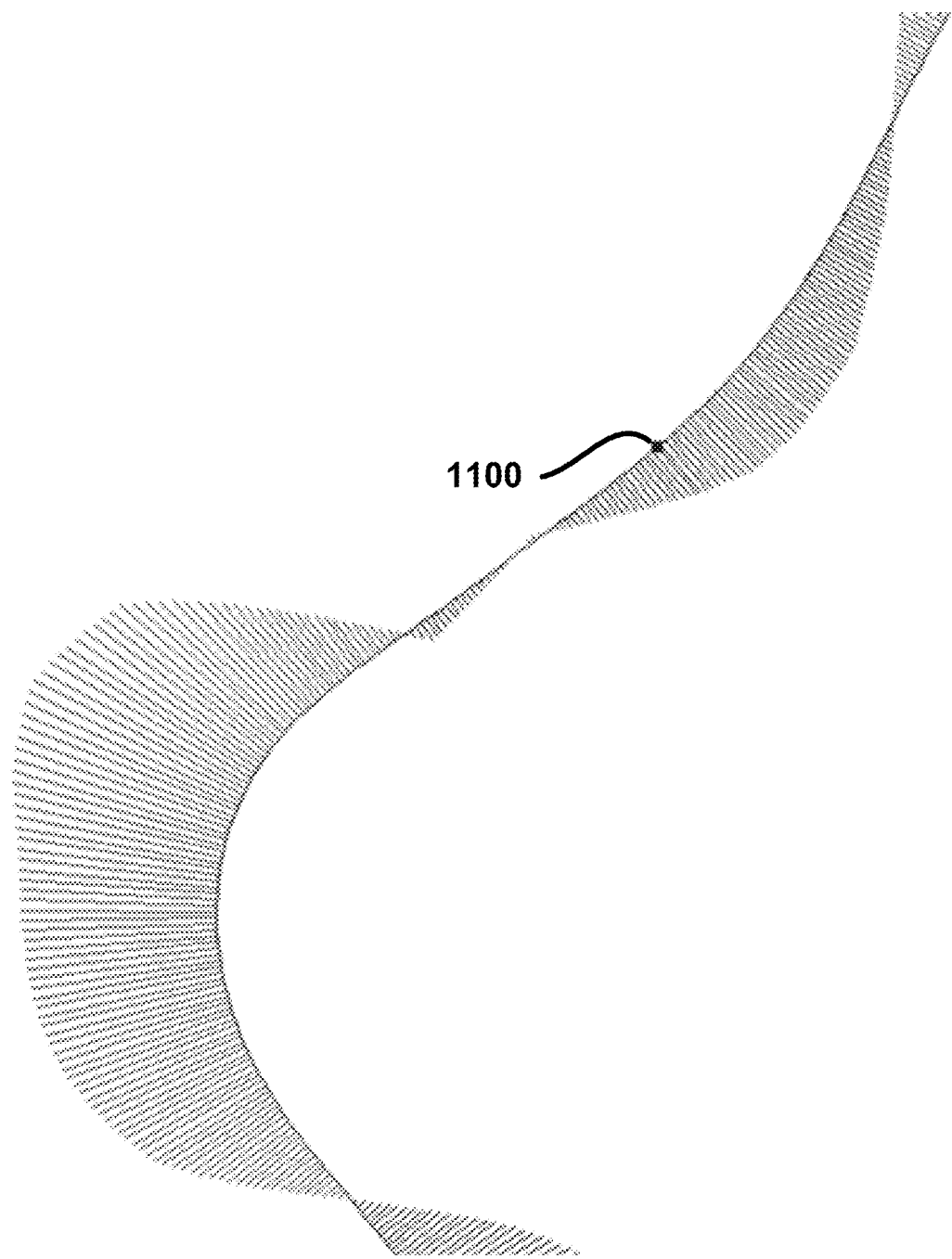
FIG. 11 depicts aligned B-spline ends, according to an example.

At block 904, the 2D B-spline routine 900 aligns B-spline ends that are misaligned within a tile. While the spline fits are overlapping, not all of the resulting B-splines join perfectly at a node as shown in FIG. 10, which depicts B-spline ends 1002, 1004 that do not meet. To align two B-splines at a node 1100 as shown in FIG. 11, the B-spline ends need to be aligned so that they meet at a common point in the XY plane with smooth tangent and curvature (i.e., C2 continuity).

To align the B-spline ends, the 2D B-spline routine 900 uses a patch B-spline to create a smooth transition between the two B-splines. The 2D B-spline routine 900 projects a mid-point on the patch B-spline between the misaligned B-spline ends 1002, 1004. The 2D B-spline routine 900 splits the patch B-spline and merges knot vectors to make each half of the patch B-spline compatible to the misaligned B-splines. The 2D B-spline routine 900 determines the parametric extent for the patch B-spline to replace the existing B-spline shape and copies the control points from the subdivided patch B-spline for the replacement region into the B-splines. The 2D B-spline routine 900 removes any unnecessary knots (e.g., due to the knot merging step to make B-splines compatible) while ensuring good B-spline quality (e.g., within error tolerances for position, heading, and curvature error).

At block 906, the 2D B-spline routine 900 aligns B-splines across tile boundaries. The B-splines between the tiles are aligned in a similar manner as described with reference to block 904. In this alignment, the curve fit for the first B-spline is within one tile, the curve fit for the second B-spline is within an adjacent tile, and the patch B-spline fits across the tile boundary. The B-spline alignment across tiles creates a seamless C2 B-spline joint at the tile boundary.

At block 908, the 2D B-spline routine 900 aligns B-spline ends at intersections where three or more roads meet. For each intersection, the 2D B-spline routine 900 locates intersecting link chain B-splines, including self-intersections. Techniques for identifying the intersection of two B-splines, including self-intersecting B-Splines, are well known in the art. For each of the intersecting B-splines, the 2D B-spline routine 900 classifies the intersection as a crossing B-spline (i.e., four segments meeting at a single node), a T-junction, or a multi-intersection (i.e., more than four segments meet at a single node). The 2D B-spline routine 900 joins the B-splines representing these roads at a common node.

At block 910, the 2D B-spline routine 900 determines an optimal split location for the splines. If the node is not at an intersection, the 2D B-spline routine 900 projects the node onto the link chain B-spline to identify the split location. If the node is an intersection node, the 2D B-spline routine 900 determines the optimal split location based on the intersection classification described with reference to block 908.

At block 912, the 2D B-spline routine 900 splits the link chain splines at the nodes using the split locations determined at block 910 to form individual B-splines, one for each segment. For crossing B-splines, the 2D B-spline routine 900 splits the splines at the location where they intersect to create a common end point where the roads meet.

For T-junctions, due to the nature of the approximating B-spline curve fitting technique, the two link chain B-splines may or may not intersect at the T-junction. For intersecting T-junction link chain B-splines, the 2D B-spline routine 900 truncates and discards any overlapping sections. For non-intersecting T-junctions, the 2D B-spline routine 900 creates an intersection location by extending or snapping (i.e., bending or shifting) the terminating B-spline for the attaching side road segment to the main road link chain B-spline. The main road B-spline is split at the location where the terminating B-spline joins the main road B-spline after being extended or snapped. Techniques for extending and adjusting the shape or position of B-splines are well known in the art.

For multi-link intersections where more than four segments meet at a single node, the 2D B-spline routine 900 adjusts the 2D spline geometry so the segments meet at a common node. Due to the local support of B-splines and the fact that they are invariant to affine transformation makes the B-splines well suited for shape and position adjustments. Techniques for adjusting B-spline geometry curves are well known in the art.

For each multi-link intersection, the 2D B-spline routine 900 determines the common 2D location of the intersection node. The optimal location depends on intersection geometry shape, complexity, and the surrounding link connectivity. The B-splines are then shifted or their 2D shape adjusted in the vicinity of the intersection to align the splines without impacting the quality of their local curvature or heading. After the adjustment step, the 2D B-spline routine 900 splits the B-splines at the common intersection location.

At block 914, the 2D B-spline routine 900 encodes 2D curvature information into the 2D B-spline. The encoded curvature information identifies locations along the B-spline where the curvature changes linearly with respect to arc-length. In between each pair of encoded locations on the B-spline, the curvature is considered linear "clothoidial," since for each section the curvature changes linearly with respect to arc-length. These cloithoidial locations are determined by first creating a "curvature profile" for the B-spline, which is a graph of curvature as a function of arc-length. The curvature profile is then approximated by a polyline (based on Douglas-Peuker algorithm) to approximate the curvature profile by linear curvature sections. The locations of the polyline vertices along the B-spline are encoded into the B-spline by inserting tagged knots at those locations.

At block 916, the 2D B-spline routine 900 optimizes knot vectors. The knot vector used during the curve fit at block 902 is not necessarily optimal with respect to the number of knots and the spacing of knots. The knot vectors are optimized to minimize storage space on the physical storage media, while maintaining quality 2D position, shape, heading, and curvature.

The 2D B-spline routine 900 locates optimal knot placement by identifying corresponding clothoid segments (i.e., linear curvature regions) along the 2D B-spline determined at block 914. Long clothoid segments may be approximated by inserting knots at equal arc length intervals. These additional knots maintain B-spline curve shape where the long clothoid segments may not be accurately represented with a single knot span.

The 2D B-spline routine 900 removes any knots not used to encode curvature at block 914 or needed to keep the B-spline within a 2D position, shape, heading, and curvature tolerance of the original B-spline. Optimal knot spacing is typically inversely proportional to curvature (i.e., the higher the curvature, the closer the knots are spaced).

2D Curve Fit to Link Chain

Figure 12:
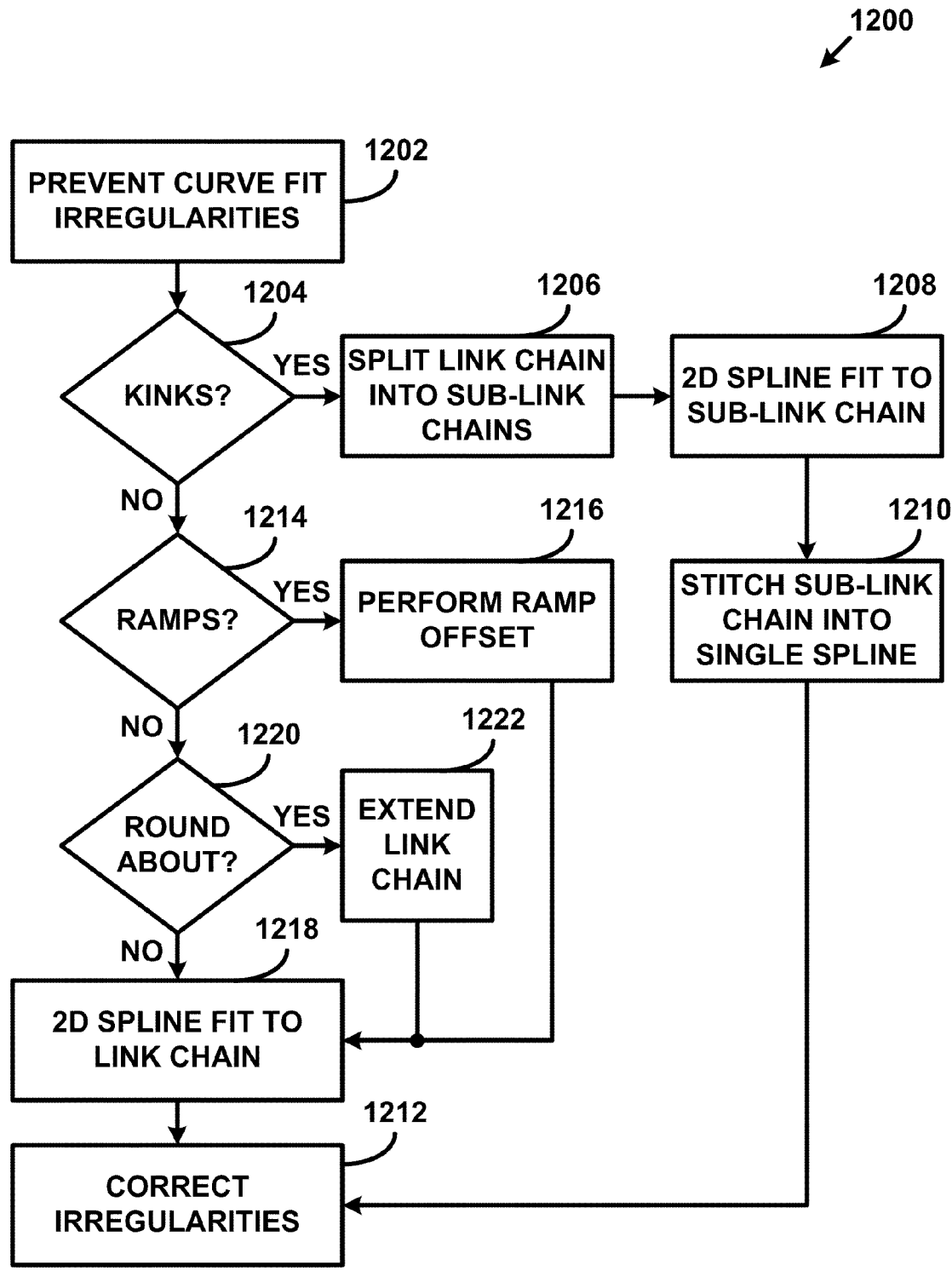
FIG. 12 is a flow chart for fitting a 2D B-spline to a link chain, according to an example.

FIG. 12 is a flow chart of a 2D B-spline curve fit routine 1200. At block 1202, the 2D B-spline curve fit routine 1200 prevents curve shape irregularities, such as bow-outs and oscillations, during the curve fit. An example preventative step includes the insertion of "virtual" shape points in sections of the link chain that are classified as straight to constrain the curve to maintain a straight shape and not bow-out or oscillate.

At block 1204, the 2D B-spline curve fit routine 1200 determines if there are any kinks in the link chain for all roads except certain functional class link chains (e.g., highways, major thoroughfares) or for switchback link chains. A shape point is identified as a "kink" point if an angle between the link segments that meet at this shape point exceeds a "kink" threshold. For example, the kink threshold may be set to 35 degrees.

For a spline curve to represent kinks, the curve has discontinuous derivatives at the kink locations (i.e., C0 continuity only). If one or more kinks in the link chain are detected, at block 1204 the 2D B-spline curve fit routine 1200 splits the link chain at each link location into individual sub-link chains between the kinks at block 1206. If no kinks are present in the link chain, the 2D spline fit is performed on the entire link chain at block 1218.

At block 1208, the 2D B-spline curve fit routine 1200 curve fits each of the sub-link chains with a 2D B-spline using the 2D curve fitting technique described with reference to block 902. The resulting spline curves meet with C0 continuity at the kink locations.

At block 1210, since the link chain is now represented by multiple splines, the 2D B-spline curve fit routine 1200 stitches the sub-link chains together into a single spline. In order to join the individual B-Spline curves into a single continuous B-spline curve, the 2D B-spline curve fit routine 1200 takes advantage of the non-uniform B-spline property that cubic non-uniform B-Splines have knot multiplicity of three at locations on the curve where it kinks (i.e., where it only has C0 continuity).

The B-spline curves are appended one at a time so that, if multiple B-spline curves need to be joined, this is accomplished by appending the second curve to the first curve to form a single curve to which the next curve can be appended and so on. Techniques for joining B-spline curves are well known in the art. Two non-uniform cubic B-spline curves with a common end point can be joined with C0 continuity by concatenating their control point arrays and adding their knot vectors.

At block 1212, the 2D B-spline curve fit routine 1200 corrects B-spline shape irregularities. The B-spline shape irregularities may include bow-outs and oscillations, but can also include regions where there are other curve irregularities, such as noisy curvature. Irregularities may occur when not enough shape points are used to define the curve of a segment or the road segment has poorly placed shape points. If the B-spline is not straight where the underlying road geometry is known to be straight after adding the virtual shape points, the 2D B-spline curve fit routine 1200 can at block 1212 manipulate the control points to straighten the B-spline. A similar technique may be used to smooth noisy curvature regions.

Figure 13:
FIG. 13 depicts a ramp spline shape for a typical cloverleaf ramp, according to an example.

Returning to block 1204, if a link chain does not have kinks, at block 1214, the 2D B-spline curve fit routine 1200 determines whether the link chain contains a ramp at either end. At block 1216, if the link chain contains a ramp, the 2D B-spline curve fit routine 1200 performs ramp offset of the end node and shape points to ensure proper ramp shape and curvature. The nodes and shape points of the motorway are used in the spline fit as well as the nodes and shape points of the ramp link chain, in order to achieve correct heading and curvature at the end of the ramp where it merges onto a motorway as shown in FIG. 13.

Figure 14:
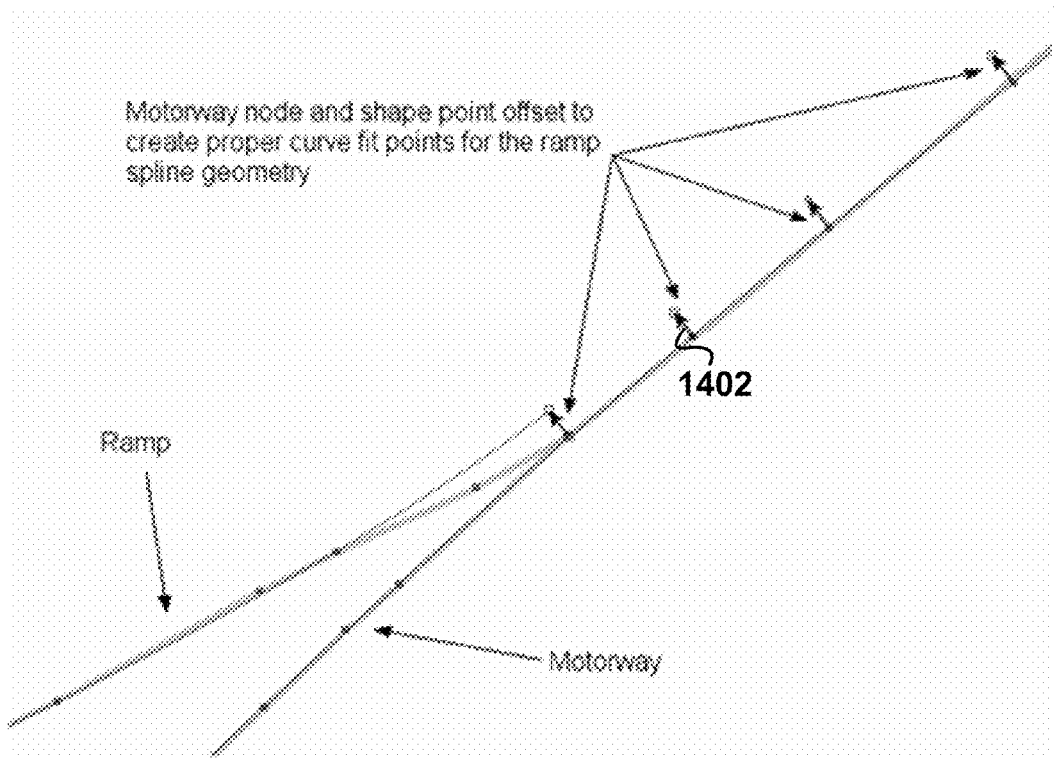
FIG. 14 depicts offsetting ramp nodes, according to an example.

The 2D B-spline curve fit routine 1200 assembles the points for the spline fit through the ramp as follows:

1. Determine if a link chain starts or ends with a ramp.
2. Identify a node that is common between the ramp link chain and the motorway.
3. In case the ramp link chain ends in several motorways, select the corresponding motorway based on the angle between the motorway link segment and the ramp link segment, and on the functional class.
4. If the angle between the motorway link segment and the ramp link segment exceeds a threshold value (e.g., 50 degrees), then the spline is not fitted through the motorway shape points.
5. If the angle between the motorway link segment and the ramp link segment is less than the threshold value (e.g., 50 degrees), the spline fit is extended into the motorway by assembling motorway points to ensure ramp shape follows the motorway shape.
6. The ramp node and possibly the motorway points are offset to account for the lane width as shown in FIG. 14. The end node of the ramp and, possibly, adjacent nodes/shape points are shifted so that the ramp link chain, and later the spline, follows the actual car path from the ramp to the motorway lane, rather than artificial connection to the motorway center line.
7. Fit spline to assembled and offset node and shape points.
8. Truncate spline at motorway node at block 912.

The length of the ramp offset vectors 1402 depicted in FIG. 14 depends on known or estimated width of the motorway. An estimated width is determined based on the number of motorway lanes, motorway restrictions on travel direction (i.e., one way or two way), and the number of lanes in the ramp (the ramp is always assumed to be one way). To avoid the ramp spline curling towards the centerline of the motorway, the 2D B-spline curve fit routine 1200 ensures that the internal ramp shape points and/or nodes are not closer to the motorway centerline than the offset motorway/ramp common node. If some of the internal ramp shape points and/or nodes are closer, the 2D B-spline curve fit routine 1200 projects the internal ramp shape points and/or nodes on a line that is parallel to the motorway link segment away from the ramp/motorway intersection node and that passes through the phantom node that results from offsetting the intersection node. FIG. 13 shows the resulting ramp spline shape for a typical cloverleaf ramp.

At block 1218, the 2D B-spline curve fit routine 1200 fits the link chains with a 2D B-spline as described with reference to block 902. At block 1212, the 2D B-spline curve fit routine 1200 corrects B-spline shape irregularities as previously described.

Returning to block 1214, if the link chain is not a ramp, at block 1220, the 2D B-spline curve fit routine 1200 determines whether the link chain is a roundabout. If the link chain is a roundabout, at block 1222, the 2D B-spline curve fit routine 1200 extends the link chain to make three revolutions of the roundabout. Multiple revolution spline fits to roundabouts prevents tear-drop shaped roundabout geometry. Later at block 912, the appropriate sections of the overlapping roundabout spline are truncated to yield the individual splines for the roundabout.

Creating 3D B-Splines

Figure 15:
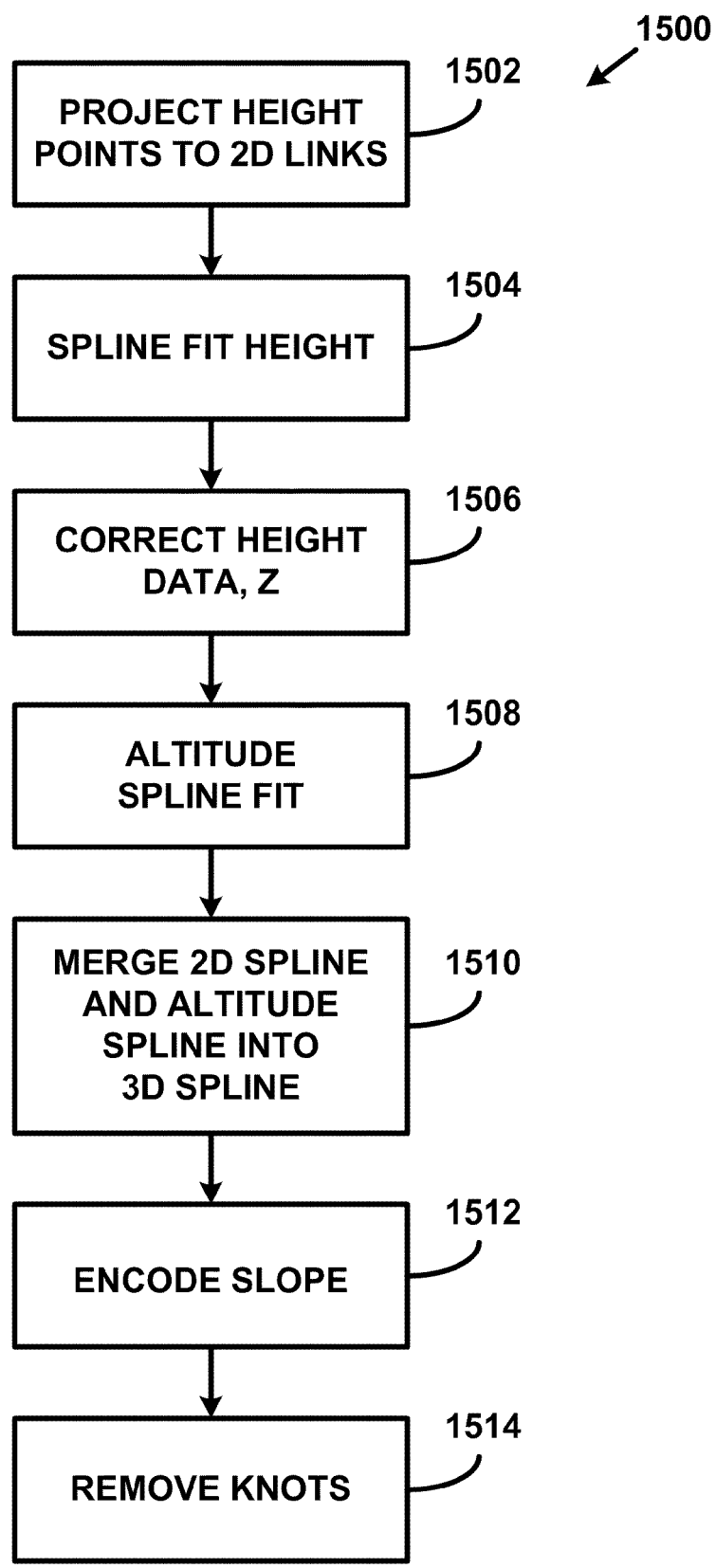
FIG. 15 is a flow chart for creating 3D B-splines, according to an example.

FIG. 15 is a flow chart of a method 1500 for creating 3D B-splines. The method 1500 for creating 3D B-splines is a software routine (or a plurality of software routines) that may be performed on any computer prior to storing data in the geographic database 106 for use in the MPE 116.

The 3D B-splines are created by combining 2D B-splines (obtained with the 2D B-spline routine 900) with 1D elevation splines. The 1D elevation splines are created by fitting splines to vehicle collected GPS data. Roads that require 3D splines are driven with the collection vehicle, resulting in large quantities of sequential data points (with associated latitude, longitude, height, heading, slope, and/or velocity data). The data points are collected with GPS and Inertial Measurement Units (GPS/IMU) to maintain absolute and relative geo-location accuracy. The height point datasets are filtered and adjusted to remove any data anomalies. The filtering cleans up any extraneous data due to gas stops, off-road driving, turn-around maneuvers, and so on. The datasets are then grouped into smaller datasets based on spatial and time continuity.

At block 1502, to facilitate storage and geo-referencing between datasets, the height points are organized by projecting the points (using 2D XY projection) onto a database of known geometric 2D road centerlines. Each point is assigned to a specific road link and parameterized to a specific distance along the link. This association allows the elevation data to reference the existing information within the road database.

The 3D B-spline routine 1500 performs point to 2D link projections by crawling along known road link paths (road network) and projecting the points onto each possible link path. The number of possible link paths is narrowed by the coded road restrictions in the database; such as one-way direction of travel limits and functional class level. To obtain the correct link path for the GPS point trace, multiple paths are tested until a single correct path is found. If multiple valid paths are found, a penalty criterion is computed based on the difference between the original GPS path shape and the link projected path shape; the path with the minimal total 2D offset, angle difference, shape difference, and/or travel distance difference is chosen as the correct road link sequence. This sequence of links is referred to as the elevation link chain.

At block 1504, the 3D B-spline routine 1500 fits 1D altitude B-splines to the height points along the elevation link chain. This allows for a compact elevation representation, which saves storage space and database I/O bandwidth. The height points obtained at block 1502 are monotonically sorted along the elevation link chain based on the link chain order and the link parameter distance found from the 2D point/link projection. The elevation link chain is traversed to compute the 2D arc length distance to each of the projected elevation points. This pair of data (link chain arc length and elevation) defines the dataset for computing the 1D elevation splines.

The 3D B-spline routine 1500 divides the elevation link chain into smaller link chains before creating the 1D elevation splines. Although the goal is to create an individual spline for each road link, an intermediate spline is generated over multiple link chain sections (e.g., up to 1000 meters) to maintain a smooth altitude B-spline across link boundaries. The 3D B-spline routine 1500 overlaps the larger link chains so that a smooth spline is also generated across the elevation link chain boundaries.

In some cases, a single elevation spline fit is not desired across adjacent links. Therefore, the 3D B-spline routine 1500 further splits the larger link chains based on the underlying road database characteristics and drive path; link chains are split at locations where the elevation may contain abrupt changes in slope or elevation. For example, the chain is split when the path bends more than 80 degrees (e.g., turning onto a different road) and where the link chain contains a data gap. The 3D B-spline routine 1500 then splits the 1D altitude B-splines at the road link node locations.

The 3D B-spline routine 1500 stores the resulting B-splines in a database such that each spline is linked to a 2D road link reference. In addition, two elevation traversals (at the spline beginning and end points) are saved in the database for each road link elevation spline. The elevation traversals store the altitude of the spline when it traverses across a road link node. A reference to the link node is stored. A single road link node will contain multiple elevation traversals where elevation splines overlap. This database of elevation traversals describes the possible crossing locations of elevation splines and allows the 3D B-spline routine 1500 at block 1506 to efficiently query crossing locations and the differences in altitude between the crossing splines In blocks 1502 and 1504, the 3D B-spline routine 1500 associates the altitude B-spline data to the road link map database such that previous knowledge of the road attributes may be added to the splines. This allows for intelligent processing of the altitude B-splines, such as knowing if the elevation data is at an intersection or on a ramp (where crossing elevations are allowed to differ). Thus, a more accurate elevation solution is possible.

At block 1506, the 3D B-spline routine 1500 adjusts height data collected via a GPS/IMU installed in a vehicle traveling along a road network. An example elevation correction routine is further discussed with reference to FIG. 16. Limits in the accuracy of GPS/IMU geo-referencing equipment may introduce some drift in the absolute altitude of the collected data points. As a result, when two roads intersect, each spline might incorrectly describe a slightly different height for the same intersection. Some spline crossing nodes have different elevations (such as a bridge crossing over another road). Thus, the elevation correction routine determines where the 3D splines intersect at grade. By taking advantage of the road map database associated with the altitude B-splines (using the B-spline road link as the reference), it is possible to know where the road links cross, if they connect at the same level, or if the link is an overpass or underpass. The database of elevation traversals was created in block 1504 for this purpose.

Figure 16:
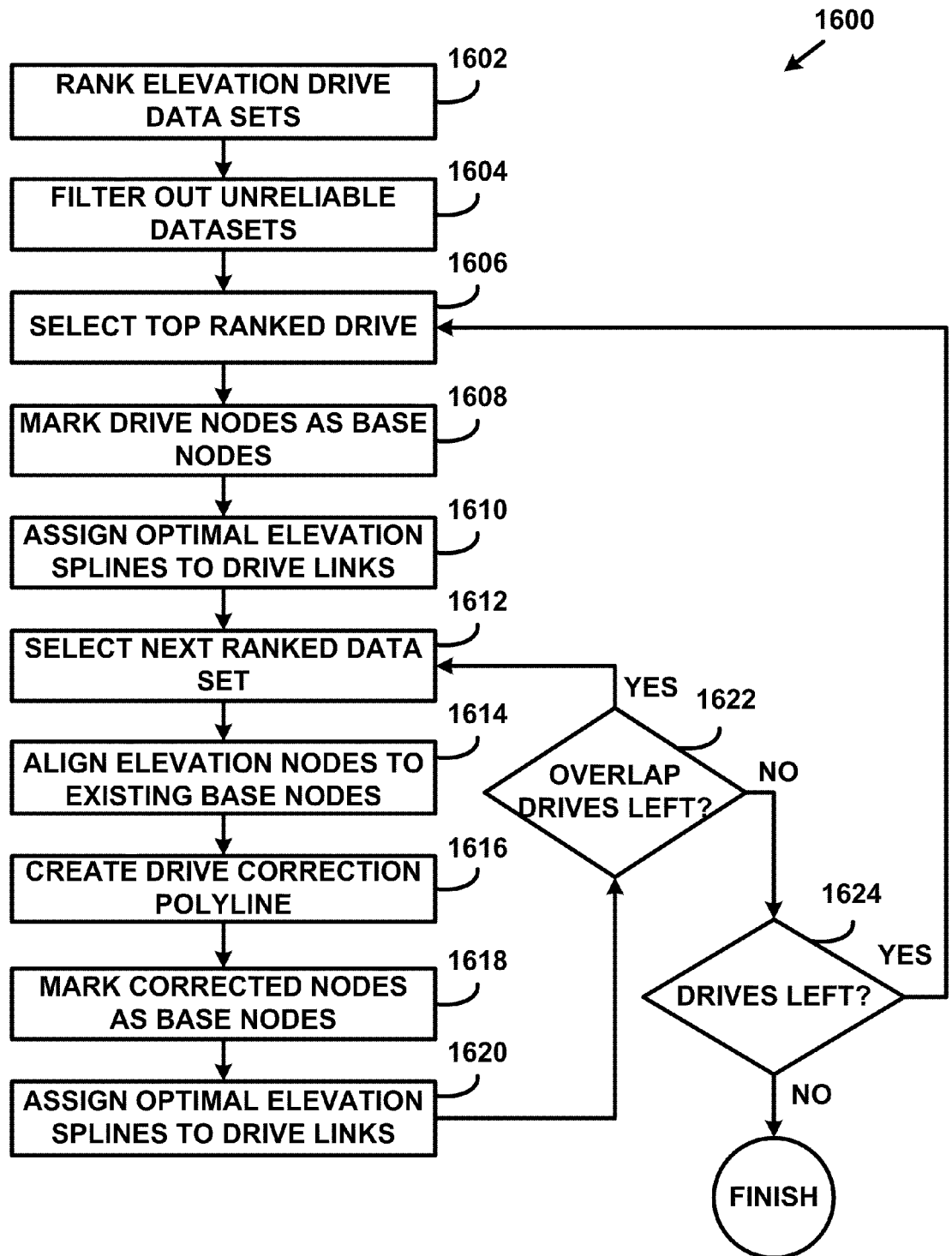
FIG. 16 is a flow chart of an elevation correction routine, according to an example.

FIG. 16 is a flow chart of an elevation correction routine 1600. The elevation correction routine 1600 is preferably performed as a global operation such that the entire database of elevation splines is corrected in a single process. A global solution is desired since shifting one elevation dataset affects the fit of the other elevation datasets that it crosses. To minimize the global solution work load, the elevation correction routine 1600 accesses only the elevation traversals (obtained at block 1504). The data may be accessed with a single database query performed against the elevation traversal database. This locates the nodes where elevation splines intersect; only the nodes where splines overlap are returned. This allows the elevation correction routine 1600 to look at the elevation differences without having to access or evaluate the actual elevation splines.

The elevation correction routine 1600 applies two operations to the altitude splines. First, elevations are corrected vertically so that splines cross common road link nodes at the same elevation. Second, multiple elevation splines are often available for a single road link. The elevation correction routine 1600 selects a single optimal altitude spline for each road link. The selected optimal altitude spline is then used for the rest of the altitude spline creation process.

To align the elevation at the road link nodes, the elevation is changed as minimally as possible and an emphasis is placed on maintaining consistency in the data. The elevation data is very accurate relative to its surrounding, chronologically local data. Due to drift, however, the absolute elevation may contain larger deviations. Therefore, the alignment process maximizes the usage of contiguous data (high relative accuracy) and minimizes switching between different datasets (absolute elevation dependent). Averaging of redundant elevation data is discouraged. Instead, the elevation correction routine 1600 determines a node elevation by selecting the single best elevation from the best dataset. Ideally, the same dataset is used for the maximum possible nearby elevation nodes to maintain consistency.

At block 1602, the elevation datasets are ranked based on how well they agree in elevation with other nearby dataset elevations, the drive distance, and the drive accuracy confidence. The rank controls the order that the drives are applied in the elevation correction routine 1600. The order determines which elevations are assigned directly from the original elevation splines (referred to as 'base node' elevations) and which elevations are adjusted (corrected elevations) to fit to existing elevation splines. In addition, this order determines which elevation splines (when there are multiple splines available for single road link) are selected as the spline to use when generating the final altitude spline at block 1508.

At block 1604, drives which fall outside of a minimum confidence level are excluded from the alignment process. This prevents unreliable data from causing unnecessary elevation offsets.

At block 1606, the highest ranked drive is chosen to initiate the elevation correction process. Since the initial drive does not overlap any existing base node elevations, the initial drive does not need to be adjusted in elevation. Therefore, at block 1608, the elevation correction routine 1600 assigns the nodes in the initial drive as 'base nodes' without a correction curve. Any following splines (from block 1612) that cross the initial drive are altered to align with the base nodes. In addition, at block 1610, the elevation correction routine 1600 assigns the elevation splines from the drive as the optimal spline for the associated 2D road links.

At block 1612, the elevation correction routine 1600 selects the next best drive from the ranked list that intersects the previously fixed drive's base nodes. At block 1614, the elevation correction routine 1600 checks the elevation nodes to see which nodes correspond to previously fixed (base nodes) of a previous drive. Offsets are calculated to align the drive's nodes with the existing base node elevations.

In addition to adjusting the drive nodes to the existing base nodes, the elevation correction is applied linearly between the base nodes. In order to preserve the original elevation data, a virtual correction polyline is created instead of altering the original elevation spline. Super-position of the original elevation spline and the virtual correction polyline results in a correctly aligned altitude spline. The virtual polyline is a linear shape that defines the elevation offsets needed to correct the original spline to fit to the other altitude spline's base nodes. Using a linear correction allows the elevation correction routine 1600 to precisely define the correction at exact locations (i.e., no over-shoot) and also allows the elevation correction routine 1600 to linearly spread the correction over a large 2D distance.

A benefit of this process is that the database of elevation splines is never accessed; there is no need to read, alter, and save the spline shapes. Since this process is a large global operation, there is a significant savings of database I/O and CPU requirements. The database activity is reduced to reading a minimal dataset; only nodes that have multiple elevation traversals are considered. The write activity is reduced to two steps; saving a single linear correction polyline for each drive and updating a status flag on elevation splines (indicating if the spline is selected as the unique representative for the road link).

At block 1616, the elevation correction routine 1600 creates a virtual, linear polyline that represents the calculated alignment offsets. The virtual polyline correction is employed to determine the corrected node heights of the non-base nodes in the drive. At block 1618, the elevation correction routine 1600 adds the corrected height nodes to the list of fixed base nodes.

As each drive is applied, the road links associated with the drive are checked to see if they have previously been assigned a unique, 'optimal' altitude spline from a previous drive. At block 1620, the elevation correction routine 1600 assigns links without an optimal spline an elevation spline from the current drive dataset. This results in a fixed elevation, drive-consistent set of altitude splines that provides a foundation for following elevation datasets.

At block 1622, the elevation correction routine 1600 checks to see if there are further drive datasets that overlap the existing base node elevations. If there are overlapping datasets, at block 1612, the elevation correction routine 1600 selects the next best drive that overlaps the existing base nodes and the process repeats. When the overlapping drives have been processed, at block 1624, the elevation correction routine 1600 checks if there are any remaining unprocessed drives. If unprocessed drives remain, at block 1606, the elevation correction routine 1600 restarts a new alignment process on the remaining best drive.

The elevation correction routine 1600 is preferably repeated until all of the drives have been processed. After processing, the elevation correction curves are stored in the database and a single, unique elevation spline is assigned to associated road links.

Returning to FIG. 15, at block 1508, the 3D B-spline routine 1500 creates a single multi-link altitude spline for the link chains created in the method 800. For each link (road segment) in the link chain, the previously selected optimal altitude B-spline (at block 1506) is converted back into elevation points at, for example, every one meter of XY arc length. The correction polyline offset (block 1506) is computed and added to each point. The result is a height aligned point set parameterized by the XY arc length of the link chain.

The 3D B-spline routine 1500 fits a new altitude B-spline to the list of elevation parameterized points for multiple links.

Each successive curve fit overlaps the spline from the previous curve fit. The overlapping curve fits ensure shape consistency at a boundary between curve fits. The altitude curve fitting technique recursively determines the optimal knot vector based on the specified curve fit Z tolerance. The specified altitude curve fit tolerance is used to determine the knot vector spacing so that there are more knots when the altitude changes rapidly and fewer knots when the altitude changes slowly. Since the height points for the altitude B-spline have been parameterized by link chain arc length, the altitude B-spline has a compatible knot vector parameter space with the 2D B-spline, which allows the B-splines to be merged into a 3D B-spline at block 1510.

At block 1510, the 3D B-spline routine 1500 merges the 2D B-spline from the method 900 and the altitude B-spline from block 1508 to obtain a 3D B-spline. The 3D B-spline representation is created by adding the altitude B-spline's Z component to the 2D B-splines created by the 2D B-spline routine 900. Since the parameter space for both the 2D B-spline and the altitude B-spline have been parameterized by the same XY link geometry arc length, the B-splines can be merged by merging their knot vectors.

The 3D B-spline routine 1500 scales the knot vectors of each of the 2D and altitude B-splines by the maximum knot value of both B-splines. The 3D B-spline routine 1500 then inserts the knots of the 2D B-spline into the altitude B-spline and the original knots of the altitude B-spline into the 2D B-spline using knot insertion. As a result, both B-splines have the same knot vectors and share the same parameter space.

The 3D B-spline routine 1500 creates the 3D B-spline from the 2D B-spline by setting the 3D B-spline's control points Z value equal to that of the Z value of the altitude B-spline as shown as follows.

$$\begin{bmatrix} 3D\_Bspline_{C_x} \\ 3D\_Bspline_{C_y} \\ 3D\_Bspline_{C_z} \end{bmatrix} = \begin{bmatrix} 2D\_Bspline_{C_x} \\ 2D\_Bspline_{C_y} \\ Altitude\_Bspline_{C_z} \end{bmatrix}$$

At block 1512, the 3D B-spline routine 1500 encodes slope information into the 3D B-spline. This is accomplished by tagging knots in the 3D B-spline that may be used to generate the linear slope profile for the electronic horizon application 208. The specified elevation and slope tolerance is used to determine the encoded knot vector spacing so that there are more slope knots when the altitude changes rapidly and fewer knots when the altitude changes slowly. In addition, more slope points are added at locations where slope inflections occur. The 3D B-spline routine 1500 identifies the encoded slope knot locations using Douglas-Peuker line approximation analysis based on elevation, slope, and slope change. The analysis is stopped once the data points are within the tolerance of the line approximation. The 3D B-spline routine 1500 inserts a "tagged" slope knot at each Douglas-Peuker polyline point along the altitude profile.

At block 1514, the 3D B-spline routine 1500 optimizes size by evaluating the knot insertions at block 1512. Since the resulting knot insertions may yield more knots than what is necessary to represent the 3D shape of the B-spline, the 3D B-spline routine 1500 removes knots not needed to encode the slope profile and curvature profile, or to maintain the B-spline quality.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for creating geometry for an advanced driver assistance system application, comprising:
   creating link chains from a plurality of segments that represent a portion of a road network;
   creating 2D B-splines from the link chains;
   creating, by a processor, 3D B-splines from the link chains, the 2D B-splines, and height data; and
   storing data representing the 2D B-splines and the 3D B-splines in a database, wherein at least one advanced driver assistance system application uses road geometry information generated from the stored 2D B-spline and the 3D B-spline data to control vehicle operation.

2. The method of claim 1, wherein creating link chains includes growing the link chains in both directions until reaching a terminal node.

3. The method of claim 1, wherein creating link chains includes identifying possible paths through a node and selecting one of the possible paths through the node.

4. The method of claim 3, wherein selecting one of the possible paths through the node includes calculating a path weight for each of the possible paths, wherein the path weight is based on an amount of direction change through the node and a difference in a number of lanes between links.

5. The method of claim 1, wherein creating 2D B-splines includes fitting a 2D B-spline to a link chain.

6. The method of claim 5, wherein fitting the 2D B-spline to the link chain includes minimizing change of curvature along the 2D B-spline.

7. The method of claim 5, wherein fitting the 2D B-spline to the link chain includes minimizing least squared error along the 2D B-spline.

8. The method of claim 1, wherein creating 2D B-splines includes aligning 2D B-spline ends using a patch B-spline.

9. The method of claim 1, wherein creating 2D B-splines includes aligning 2D B-spline ends at intersections.

10. The method of claim 1, wherein creating 2D B-splines includes splitting the 2D B-spline to form a 2D B-spline corresponding to each segment in the link chain.

11. The method of claim 1, wherein creating 2D B-splines includes encoding curvature information into the 2D B-splines.

12. The method of claim 1, wherein the height data is obtained from a GPS/IMU device installed in a collection vehicle traveling on the road network.

13. The method of claim 1, wherein the height data is projected onto a geographic database of known geometric 2D road centerlines.

14. The method of claim 1, wherein creating 3D B-splines includes adjusting the height data to correct elevation inconsistencies.

15. The method of claim 14, wherein adjusting the height data includes correcting elevation vertically and selecting a single altitude spline for each segment.

16. The method of claim 1, wherein creating 3D B-splines includes creating an altitude spline for the link chains.

17. The method of claim 16, wherein creating 3D B-splines includes merging the 2D B-splines with the altitude spline.

18. The method of claim 17, wherein merging the 2D B-splines with the altitude spline includes adding the altitude spline's z-component to the 2D B-splines.

19. The method of claim 17, wherein merging the 2D B-splines with the altitude spline includes merging knot vectors of the 2D B-splines and the altitude spline.

20. The method of claim 1, wherein creating 3D B-splines includes encoding slope information into the 3D B-splines.

21. An apparatus for creating geometry for an advanced driver assistance system application, the apparatus comprising:
- a processor configured to create link chains from a plurality of segments that represent a portion of a road network, create 2D B-splines from the link chains, and create 3D B-splines from the link chains, the 2D B-splines, and height data; and
- a database configured to store data representing the 2D B-splines and the 3D B-splines, wherein at least one advanced driver assistance system application uses road geometry information generated from the stored 2D B-spline and the 3D B-spline data to control vehicle operation.

22. An apparatus comprising:
- at least one processor; and
- at least one memory including computer program code for one or more programs; the at least one memory and the computer program code configured to, with the at least one processor, cause the apparatus to at least perform:
- create link chains from a plurality of segments that represent a portion of a road network;
- create 2D B-splines from the link chains;
- create 3D B-splines from the link chains, the 2D B-splines, and height data; and
- store data representing the 2D B-splines and the 3D B-splines in a database, wherein at least one advanced driver assistance system application uses road geometry information generated from the stored 2D B-spline and the 3D B-spline data to control vehicle operation.

* * * * *